US008584042B2

(12) United States Patent
Erol et al.

(10) Patent No.: US 8,584,042 B2
(45) Date of Patent: Nov. 12, 2013

(54) METHODS FOR SCANNING, PRINTING, AND COPYING MULTIMEDIA THUMBNAILS

(75) Inventors: Berna Erol, San Jose, CA (US); Kathrin Berkner, Los Altos, CA (US); Jonathan J. Hull, San Carlos, CA (US); Peter E. Hart, Menlo Park, CA (US)

(73) Assignee: Ricoh Co., Ltd., Tokyo (JP)

( * ) Notice: Subject to any disclaimer, the term of this patent is extended or adjusted under 35 U.S.C. 154(b) by 841 days.

(21) Appl. No.: 11/689,401

(22) Filed: Mar. 21, 2007

(65) Prior Publication Data

US 2008/0235276 A1 Sep. 25, 2008

(51) Int. Cl.
*G06F 3/048* (2013.01)

(52) U.S. Cl.
USPC ..... 715/838; 715/716; 715/202; 707/E17.009

(58) Field of Classification Search
USPC .................. 715/716, 838, 202; 707/E17.009
See application file for complete search history.

(56) References Cited

U.S. PATENT DOCUMENTS

| | | | | |
|---|---|---|---|---|
| 5,335,290 | A * | 8/1994 | Cullen et al. | 382/176 |
| 5,495,567 | A | 2/1996 | Iizawa et al. | |
| 5,619,594 | A | 4/1997 | Melen | |
| 5,625,767 | A | 4/1997 | Bartell et al. | |
| 5,761,485 | A | 6/1998 | Munyan | |
| 5,781,773 | A | 7/1998 | Vanderpool et al. | |
| 5,781,879 | A | 7/1998 | Arnold et al. | |
| 5,832,530 | A | 11/1998 | Paknad et al. | |
| 5,873,077 | A * | 2/1999 | Kanoh et al. | 1/1 |
| 5,892,507 | A | 4/1999 | Moorby et al. | |
| 5,897,644 | A | 4/1999 | Nielsen | |
| 5,903,904 | A | 5/1999 | Peairs | |
| 5,960,126 | A | 9/1999 | Nielsen et al. | |
| 5,963,966 | A | 10/1999 | Mitchell et al. | |
| 6,018,710 | A | 1/2000 | Wynblatt et al. | |
| 6,043,802 | A | 3/2000 | Gormish | |
| 6,044,348 | A | 3/2000 | Imade et al. | |
| 6,141,452 | A | 10/2000 | Murao | |
| 6,144,974 | A | 11/2000 | Gartland | |
| 6,173,286 | B1 | 1/2001 | Guttman et al. | |
| 6,178,272 | B1 | 1/2001 | Segman | |
| 6,236,987 | B1 | 5/2001 | Horowitz et al. | |

(Continued)

FOREIGN PATENT DOCUMENTS

| | | | |
|---|---|---|---|
| EP | 1 560 127 | A2 | 8/2005 |
| JP | 10-105694 | | 4/1998 |

(Continued)

OTHER PUBLICATIONS

Woodruff, Allison, et al., "Using Thumbnails to Search the Web" Proc. SIGCHI 01, Mar. 31-Apr. 4, 2001, Seattle, Washington, USA—(8 pgs.).

(Continued)

*Primary Examiner* — Boris Pesin
*Assistant Examiner* — Ece Hur
(74) *Attorney, Agent, or Firm* — Blakely, Sokoloff, Taylor & Zafman LLP

(57) ABSTRACT

A method, apparatus and article of manufacture for creating visualizations of documents are described. In one embodiment, the method comprises receiving an electronic visual, audio, or audiovisual content; generating a display for authoring a multimedia representation of the received electronic content; receiving user input, if any, through the generated display; and generating a multimedia representation of the received electronic content utilizing received user input.

17 Claims, 6 Drawing Sheets

(56) References Cited

U.S. PATENT DOCUMENTS

| | | | |
|---|---|---|---|
| 6,249,808 | B1 | 6/2001 | Seshadri |
| 6,301,586 | B1 * | 10/2001 | Yang et al. ............ 1/1 |
| 6,317,164 | B1 | 11/2001 | Hrusecky et al. |
| 6,349,132 | B1 * | 2/2002 | Wesemann et al. ........ 379/88.17 |
| 6,377,704 | B1 | 4/2002 | Cooperman |
| 6,598,054 | B2 | 7/2003 | Schuetze et al. |
| 6,665,841 | B1 | 12/2003 | Mahoney et al. |
| 6,704,024 | B2 | 3/2004 | Robotham et al. |
| 6,747,648 | B2 | 6/2004 | Hoehn et al. |
| 6,778,970 | B2 | 8/2004 | Au |
| 6,788,347 | B1 | 9/2004 | Kim et al. |
| 6,804,418 | B1 | 10/2004 | Yu et al. |
| 6,856,415 | B1 * | 2/2005 | Simchik et al. .......... 358/1.15 |
| 6,862,713 | B1 | 3/2005 | Kraft et al. |
| 6,873,343 | B2 | 3/2005 | Chui |
| 6,924,904 | B2 | 8/2005 | Stevens et al. |
| 6,928,087 | B2 * | 8/2005 | Slowe et al. ............ 370/477 |
| 6,931,151 | B2 * | 8/2005 | Weast ............ 382/162 |
| 6,938,202 | B1 * | 8/2005 | Matsubayashi et al. ...... 715/234 |
| 6,940,491 | B2 * | 9/2005 | Incertis Carro ............ 345/173 |
| 6,970,602 | B1 * | 11/2005 | Smith et al. ............ 382/232 |
| 7,010,746 | B2 | 3/2006 | Purvis |
| 7,020,839 | B1 | 3/2006 | Hosoda |
| 7,035,438 | B2 | 4/2006 | Harrington et al. |
| 7,051,275 | B2 * | 5/2006 | Gupta et al. ............ 715/201 |
| 7,069,506 | B2 | 6/2006 | Rosenholtz et al. |
| 7,095,907 | B1 | 8/2006 | Berkner et al. |
| 7,107,525 | B2 | 9/2006 | Purvis |
| 7,151,547 | B2 | 12/2006 | Lin et al. |
| 7,171,617 | B2 | 1/2007 | Harrington et al. |
| 7,171,618 | B2 * | 1/2007 | Harrington et al. ........ 715/229 |
| 7,177,488 | B2 | 2/2007 | Berkner et al. |
| 7,203,902 | B2 | 4/2007 | Balinsky |
| 7,263,659 | B2 | 8/2007 | Hull et al. |
| 7,272,258 | B2 | 9/2007 | Berkner et al. |
| 7,272,791 | B2 | 9/2007 | Sahuc et al. |
| 7,330,608 | B2 | 2/2008 | Berkner et al. |
| 7,383,505 | B2 | 6/2008 | Shimzu et al. |
| 7,428,338 | B2 | 9/2008 | Berkner et al. |
| 7,434,159 | B1 | 10/2008 | Lin |
| 7,487,445 | B2 | 2/2009 | Purvis et al. |
| 7,505,178 | B2 | 3/2009 | Erol et al. |
| 7,573,604 | B2 * | 8/2009 | Hull et al. ............ 358/1.8 |
| 7,576,756 | B1 | 8/2009 | Good et al. |
| 7,603,620 | B2 | 10/2009 | Erol et al. |
| 7,624,169 | B2 | 11/2009 | Lisiecki et al. |
| 7,640,164 | B2 | 12/2009 | Sasaki et al. |
| 7,861,169 | B2 * | 12/2010 | Hull et al. ............ 715/704 |
| 7,886,226 | B1 * | 2/2011 | McCoy et al. ............ 715/273 |
| 8,073,263 | B2 * | 12/2011 | Hull et al. ............ 382/224 |
| 8,156,116 | B2 * | 4/2012 | Graham et al. ............ 707/728 |
| 8,201,076 | B2 * | 6/2012 | Hull et al. ............ 715/205 |
| 8,271,489 | B2 * | 9/2012 | Lin et al. ............ 707/736 |
| 2001/0056434 | A1 * | 12/2001 | Kaplan et al. .......... 707/104.1 |
| 2002/0029232 | A1 | 3/2002 | Bobrow et al. |
| 2002/0055854 | A1 | 5/2002 | Kurauchi et al. |
| 2002/0073119 | A1 | 6/2002 | Richard |
| 2002/0184111 | A1 | 12/2002 | Swanson |
| 2002/0194324 | A1 * | 12/2002 | Guha ............ 709/223 |
| 2003/0014445 | A1 | 1/2003 | Formanek et al. |
| 2003/0182402 | A1 | 9/2003 | Goodman et al. |
| 2003/0196175 | A1 * | 10/2003 | Shea ............ 715/526 |
| 2004/0019851 | A1 | 1/2004 | Purvis et al. |
| 2004/0025109 | A1 | 2/2004 | Harrington et al. |
| 2004/0070631 | A1 | 4/2004 | Brown et al. |
| 2004/0093565 | A1 | 5/2004 | Bernstein et al. |
| 2004/0120589 | A1 | 6/2004 | Lopresti et al. |
| 2004/0145593 | A1 | 7/2004 | Berkner et al. |
| 2004/0181747 | A1 * | 9/2004 | Hull et al. ............ 715/500.1 |
| 2004/0201609 | A1 | 10/2004 | Obrador |
| 2004/0230570 | A1 | 11/2004 | Hatta et al. |
| 2005/0028074 | A1 | 2/2005 | Harrington et al. |
| 2005/0068581 | A1 | 3/2005 | Hull et al. |
| 2005/0071763 | A1 * | 3/2005 | Hart et al. ............ 715/731 |
| 2005/0076290 | A1 | 4/2005 | Balinsky |
| 2005/0084136 | A1 | 4/2005 | Xie et al. |
| 2005/0223326 | A1 | 10/2005 | Chang et al. |
| 2005/0229107 | A1 * | 10/2005 | Hull et al. ............ 715/764 |
| 2005/0246375 | A1 * | 11/2005 | Manders et al. .......... 707/104.1 |
| 2005/0289127 | A1 | 12/2005 | Giampaolo et al. |
| 2006/0022048 | A1 | 2/2006 | Johnson |
| 2006/0122884 | A1 * | 6/2006 | Graham et al. ............ 705/14 |
| 2006/0136491 | A1 | 6/2006 | Berkner et al. |
| 2006/0136803 | A1 | 6/2006 | Erol et al. |
| 2006/0161562 | A1 | 7/2006 | McFarland et al. |
| 2006/0256388 | A1 | 11/2006 | Erol et al. |
| 2007/0047002 | A1 * | 3/2007 | Hull et al. ............ 358/3.28 |
| 2007/0061384 | A1 * | 3/2007 | Harrington et al. .......... 707/203 |
| 2007/0091366 | A1 * | 4/2007 | McIntyre ............ 358/1.15 |
| 2007/0118399 | A1 | 5/2007 | Avinash et al. |
| 2007/0168852 | A1 | 7/2007 | Erol et al. |
| 2007/0198951 | A1 | 8/2007 | Frank |
| 2007/0201752 | A1 | 8/2007 | Gormish et al. |
| 2007/0203901 | A1 * | 8/2007 | Prado et al. ............ 707/5 |
| 2007/0208996 | A1 | 9/2007 | Berkner et al. |
| 2008/0005690 | A1 | 1/2008 | Van Vugt |
| 2008/0168154 | A1 | 7/2008 | Skyrm et al. |
| 2008/0228479 | A1 * | 9/2008 | Prado ............ 704/235 |
| 2008/0235207 | A1 | 9/2008 | Berkner et al. |
| 2008/0235276 | A1 | 9/2008 | Erol et al. |
| 2008/0235564 | A1 * | 9/2008 | Erol et al. ............ 715/202 |
| 2008/0235585 | A1 * | 9/2008 | Hart et al. ............ 715/717 |
| 2009/0100048 | A1 * | 4/2009 | Hull et al. ............ 707/5 |
| 2009/0125510 | A1 * | 5/2009 | Graham et al. ............ 707/5 |

FOREIGN PATENT DOCUMENTS

| | | |
|---|---|---|
| JP | 10-116065 | 5/1998 |
| JP | 10-162003 | 6/1998 |
| JP | 2000-231475 | 8/2000 |
| JP | 2000-306103 | 11/2000 |
| JP | 2001-056811 | 2/2001 |
| JP | 2001-101164 | 4/2001 |
| JP | 2002-351861 | 12/2002 |
| JP | 2005-110280 | 4/2005 |
| WO | WO 2007023991 A1 * | 3/2007 |

OTHER PUBLICATIONS

Ogden, William, et al., "Document Thumbnail Visualizations for Rapid Relevance Judgments: When do they pay off?" TREC 1998, pp. 528-534, (1995) (7 pgs.).

Peairs, Mark, "Iconic Paper", Proceedings of $3^{rd}$ ICDAR, '95, vol. 2, pp. 1174-1179 (1995) (6 pgs.).

Graham, Jamey, "The Reader's Helper: a personalized document reading environment," Proc. SIGCHI '99, May 15-20, 1999, pp. 481-488, (9 pgs.).

Breuel, Thomas M., et al., "Paper to PDA," IEEE 2002, pp. 476-479 (2002) (4 pgs.).

JPEG 2000 Part 6 FCD15444-6, Information Technology JPEG 2000 "Image Coding Standard—Part 6: Compound Image File Format" ISO/IEC, JTC1/SC 29/WG1 N2401, FCD 15444-6, Nov. 16, 2001 (81 pgs.).

JBIG—Information Technology—Coded Representation of Picture and Audio Information—Lossy/Lossless Coding of Bi-level Images, ISO/IEC, JTC1/SC 29/WG1 N1359, 14492 FCD, Jul. 16, 1999, (189 pgs.).

Zhao, et al., "Narrowing the Semantic Gap-Improved Text-Based Web Document Retrieval Using Visual features," IEEE, pp. 189-200.

Rollins, Sami, et al, "Wireless and Mobile Networks Performance: Power-Aware Data Management for Small Devices", Proceedings of the 5th ACM International Workshop on Wireless Mobile Multimedia WOWMOM '02, Sep. 2002, pp. 80-87.

Hexel, Rene, et al, "PowerPoint to the People: Suiting the Word to the Audience", Proceedings of the Fifth Conference on Australasian User Interface—vol. 28 AUIC '04, Jan. 2004, pp. 49-56.

Muer, O. Le, et al, "Performance Assessment of a Visual Attention System Entirely Based on a Human Vision Modeling," Proceedings of ICIP 2004, Singapore, 2004, pp. 2327-2330.

Matsuo, Y., et al, "Keyword Extraction from a Single Document using Word Co-occurrence Statistical Information," International Journal on Artificial Intelligence Tools, vol. 13, No. 1, Jul. 13, 2003, pp. 157-169.

(56) References Cited

OTHER PUBLICATIONS

Fukumoto, Fumiyo, et al, "An Automatic Extraction of Key Paragraphs Based on Context Dependency," Proceedings of Fifth Conference on Applied Natural Language Processing, 1997, pp. 291-298.
Aiello, Marco, et al, "Document Understanding for a Broad Class of Documents," vol. 5(1), International Journal on Document Analysis and Recognition (IJDAR) (2002) 5, pp. 1-16.
Dowsland, Kathryn A., et al., "Packing Problems," European Journal of Operational Research, 56 (1002) 2-14, North-Holland, 13 pages.
Meller, Russell D., et al., "The Facility Layout Problem: Recent and Emerging Trends and Perspectives," Journal of Manufacturing Systems, vol. 15/No. 5 1996, pp. 351-366.
Hahn, Peter, M., "Progress in Solving the Nugent Instances of the Quadratic Assignment Problem," 6 pages.
Maderlechner, et al., "Information Extraction from Dcoument Images using Attention Based Layout Sementation," Proceedings of DLIA, 1999, pp. 216-219.
Wang, et al., "MobiPicture—Browsing Pictures on Mobile Devies," 2003 Multimedia Conference, Proceedings of the 11th ACM International Conference on Multimedia, ACM MM'03, ACM 1-58113-722-02/03/0011, Berkeley, California, Nov. 2-8, 2003, 5 pages.
Fan, et al. "Visual Attention Based Image Browsing on Mobile Devices," International Conference on Multimedia and Exp., vol. 1, Baltimore, MD., IEEE, 0-7803-7965-9/03 Jul. 2003, pp. 53-56.
Cormen, Thomas H., Leiserson, Charles, E., and Rivest, Ronald L., Introduction to Algorithms, MIT Press, Mc-Graw-Hill, Cambridge Massachusetts, 1997, 6 pages.
Roth, et al., "Auditory Browser for Blind and Visually Impaired Users," CHI'99, Pittsburgh, Pennsylvania, May 15-20, 1999, ACM ISBN 1-58113-158-5, pp. 218-219.
Lam, H., et al., "Summary Thumbnails: Readable Overviews for Small Screen Web Browsers," CHI 2005, Conference Proceedings. Conference on Human Factors in Computing Systems, Portland, Oregon, Apr. 2-7, 2005, CHI Conference Proceedings, Human Factors in Computing Systems, New York, NY: ACM, US, Apr. 2, 2005, XP002378456, ISBN: 1-58113-998-5, pp. 1-10.
Erol, B., et al., "Multimedia Thumbnails: A New Way to Browse Documents on Small Display Devices," Ricoh Technical Report No. 31, XP002438409, Dec. 2005, http://www.ricoh.co.jp/about/business_overview/report/31/pdf/A3112.pdf>, 6 pages.
European Patent Office Search Report for European Patent Application EP 07 25 0134, Jun. 21, 2007, 9 pages.
Erol, Berna, et al., An Optimization Framework for Multimedia Thumbnails for Given Time, Display, and Application Constraints, Aug. 2005, 1-17 pages.
El-Kwae, E., et al., "A Robust Framework for Content-Based Retrieval by Spatial Similarity in Image Databases," Transactions on Information Systems (TOIS), vol. 17, Issue 2, Apr. 1999, pp. 174-198.
Haralick, Robert M., "Document Image Understanding: Geometric and Logical Layout," IEEE Computer Vision and Pattern Recognition 1994 (CVPR94), 1063-6919/94, pp. 385-390.
Hsu, H.T., An Algorithm for Finding a Minimal Equivalent Graph of a Digraph, Journal of the ACM (JACM), V. 22 N. 1, Jan. 1975, pp. 11-16.
Nagy, Georgy, et. al., "Hierarchical Representation of Optically Scanned Documents," Proc. Seventh Int'l Conf. Pattern Recognition, Montreal, 1984 pp. 347-349.
Dengel, A., "ANASTASIL: A System for Low-Level and High-Level Geometric Analysis of Printed Documents" in Henry S. Baird, Horst Bunke, and Kazuhiko Yamamoto, editors, Structured Document Image Analysis, Springer-Verlag, 1992, pp. 70-98.
Duda, et al., "Pattern Classification," Second Edition, Chapter 1—Introduction, Copyright @ 2001 by John Wiley & Sons, Inc., New York, ISBN0-471-05669-3 (alk. paper), 22 pages.
Gao, et al., "An Adaptive Algorithm for Text Detection from Natural Scenes," Proceedings of the 2001 IEEE Computer Society Conferences on Computer Vision and Pattern Recognition, Kauai, HI, USA, Dec. 8-14, 6 pages.
Polyak, et al., "Mathematical Programming: Nonlinear Rescaling and Proximal-like Methods in Convex Optimization," vol. 76, 1997, pp. 265-284.
Baldick, et al., "Efficient Optimization by Modifying the Objective Function: Applications to Timing-Driven VLSI Layout," IEEE Transactions on Circuits and Systems, vol. 48, No. 8, Aug. 2001, pp. 947-956.
Kandemir, et al. "A Linear Algebra Framework for Automatic Determination of Optimal Data Layouts," IEEE Transactions on Parallel and Distributed System, vol. 10, No. 2, Feb. 1999, pp. 115-135.
Lin, Xiaofan, "Active Document Layout Synthesis," IEEE Proceedings of the Eight International Conference on Document Analysis and Recognition, Aug. 29, 2005-Sep. 1, 2005, XP010878059, Seoul, Korea, pp. 86-90.
European Patent Office Search Report for European Patent Application EP 07 25 0928, Jul. 8, 2009, 7 pages.
Fukuhara, R., "International Standard for Motion Pictures in addition to Still Pictures: Summary and Application of JPEG2000/Motion-JPEG2000 Second Part", Interface, Dec. 1, 2002, 13 pages, vol. 28-12, CQ Publishing Company, *no. translation provided*, 17 pages.
Japanese Office Action for Japanese Patent Application No. 2004-018221, dated Jun. 9, 2009, 6 pages.
Harrington, Steven J., et al., "Aesthetic Measures for Automated Document Layout," Proceedings of Document Engineering '04, Milwaukee, Wisconsin, ACM 1-58113-938-01/04/0010, Oct. 28-30, 2004, 3 pages.
European Patent Office Search Report for European Patent Application EP 08 152 937.2-1527, Jun. 8, 2009, 4 pages.
European Patent Office Search Report for European Patent Application EP 08 152 937.2-1527, Jul. 9, 2008, 7 pages.
Erol B., et al., "Multimedia Thumbnails for Documents," Proceedings of the MM'06, XP-159593-447-2/06/0010, Santa Barbara, California, Oct. 23-27, 2006, pp. 231-240.
Berkner, Kathrin, et al., "SmartNails—Display and Image Dependent Thumbnails," Proceedings of SPIE-IS&T Electronic Imaging, SPIE vol. 5296 © 2004, SPIE and IS&T—0277-786X/04, Downloaded form SPIE Digital Library on Jan. 29, 2010 to 151.207.244.4, pp. 54-65.
European Patent Office Search Report for European Patent Application EP 08153000.8-1527, Oct. 7, 2008, 7 pages.
World Wide Web Consortium, Document Object Model Level 1 Specification, ISBN-10; 1583482547, Iuniverse Inc, 2000., 212 pages.
Erol, B., et al., "Computing a Multimedia Representation for Documents Given Time and Display Constraints," Proceedings of ICME 2006, Toronto, Canada, 2006, pp. 2133-2136.
Erol, B., et al., "Prescient Paper: Multimedia Document Creation with Document Image Matching," IEEE Proceedings of the 17th International Conference on Pattern Recognition, 2004, ICPR 2004, vol. 2, Downloaded on May 6, 2010, pp. 675-678.
Marshall, C.C, et al., "Reading-in-the-Small: A Study of Reading on Small Form Factor Devices," Proceedings of the JCDL 2002, Jul. 13-17, 2002, Portland, Oregon, ACM 1-58113-513-0/02/0007, pp. 56-64.
Breuel, T., et al., "Paper to PDA," Proceedings of the 16th International Conference on Pattern Recognition, vol. 1, Publication Date: 2002, pp. 476-479.
Chen, F., et al., "Extraction of Indicative Summary Sentences from Imaged Documents," Proceedings of the Fourth International Conference on Document Analysis and Recognition, 1997, vol. 1, Publication Date: Aug 18-20, 1997, pp. 227-232.
Alam, H., et al., "Web Page Summarization for Handheld Devices: A Natural Language Approach," Proceedings of the 7th International Conference on Document Analysis and Recognition, 2003, pp. 1153-1157.
Eglin, V., et al., "Document Page Similarity Based on Layout Visual Saliency: Application to Query by Example and Document Classification," Proceedings of the 7th International Conference on Document Analysis and Recognition, 2003, Publication Date: Aug. 3-6, 2003, pp. 1208-1212.

(56) References Cited

OTHER PUBLICATIONS

Xie, Xing, et al., "Learning User Interest for Image Browsing on Small-Form-Factor Devices," Proceedings of ACM Conference Human Factors in Computing Systems, 2005, pp. 671-680.
Neelamani, Ramesh, et al., "Adaptive Representation of JPEG 2000 Images Using Header-Based Processing," Proceedings of IEEE International Conference on Image Processing 2002, pp. 381-384.
Xie, Xing, et al., "Browsing Large Pictures Under Limited Display Sizes," IEEE Transactions on Multimedia, vol. 8 Issue: 4, Digital Object Identifier : 10.1109/TMM.2006.876294, Date: Aug. 2006, pp. 707-715.
Liu, F, et al., "Automating Pan and Scan," Proceedings of International Conference of ACM Multimedia, Oct. 23-278, 2006,Santa Barbara, CA, ACM 1-59593-447-2/06/0010, 10 pages.
Woodruff, Allison, et al., "Using Thumbnails to Search the Web," Proceedings from SIGCHI 200, Mar. 31-Apr. 4, 2001, Seattle, WA, ACM 1-58113-327-8/01/0003, pp. 198-205.
Secker, A., et al., "Highly Scalable Video Compression with Scalable Motion Coding," IEEE Transactions on Image Processing, vol. 13, Issue 8, Date: Aug. 2004, Digital Object Identifier: 10.1109/TIP.2004.826089, pp. 1029-1041.
"ISO/IEC JTC 1/SC 29/WG 1 N1646R, (ITU-T SG8) Coding of Still Pictures, JBIG (Joint Bi-Level Image Experts Group)," JPEG—(Joint Photographic Experts Group), Mar. 16, 2000, Title: JPEG 2000 Part I Final Committee Draft Version 1.0, Source: ISO/IEC JTC1/SC29 WG1, JPEG 2000, Editor Martin Boliek, Co-Editors: Charilaos Christopoulous, and Eric Majani, Project: 1.29.15444 (JPEG 2000), 204 pages.
"Information Technology—Coding of Audio-Visual Objects—Part 2: Visual," ITU-T International Standard ISO/IEC 14496-2 Second Edition, Dec. 1, 2001 (MPEG4-AVC), Reference No. ISO/IEC 14496-2:2001(E), 536 pages.
Salton, Gerard, "Automatic Indexing," *Automatic Text Processing, The Transformation, Analysis, and Retrieval of Information by Computer*, Chapter 9, Addison Wesley Publishing Company, ISBN: 0-201-12227-8, 1989, 38 pages.
Peairs, Mark, "Iconic Paper", Proceedings of 3rd ICDAR, '95, vol. 2, pp. 1174-1179 (1995) (3 pgs.).
JBIG—Information Technology- Coded Representation of Picture and Audio Information—Lossy/Lossless Coding of Bi-level Images, ISO/IEC, JTC1/Sc 29/WG1 N1359, 14492 FCD, Jul. 16, 1999, (189 pgs.).
"About Netpbm," home page for Netpbm downloaded on Jan. 29, 2010, <http://netpbm.sourceforge.net/>, pp. 1-5.
"Optimization Technology Center of Northwestern University and Argonne National Laboratory," <http://www.optimization.eecs.northwestern.edu/>, 1 page, downloaded Jan. 29, 2010.
Iyengar, Vikram, et al., "On Using Rectangle Packing for SOC Wrapper/TAM Co-Optimization," <www.ee.duke.edu/~krish/Vikram.uts02.pdf>, 6 pages.
Gould, Nicholas I.M., et al., "A Quadratic Programming Bibliography," <http://www.optimization-online.org/DB_FILE/2001/02/285.pdf>, 139 pages.
Anjos, Miguel F., et al., "A New Mathematical Programming Framework for Facility Layout Design," University of Waterloo Technical Report UW-W&CE#2002-4, <www.optimization_online.org./DB_HTML/2002/454.html>, 18 pages.
"Human Resources Toolbox, Human Resources Toolbox, Building an Inclusive Development Community: Gender Appropriate Technical Assistance to InterAction Member Agencies on Inclusion of People with Diabilities," Mobility International USA, 2002 Mobility International USA, <http://www.miusa.org/idd/keyresources/hrtoolbox/humanresourcestlbx/?searchterm=Human Resources Toolbox>, downloaded Feb. 3, 2010, 1 page.
Dahl, Joachin and Vandenbeube, Lieven, "CVXOPT: A Python Package for Convex Optimization," <http://abel.ee.ucla.edu/cvxopt/ downloaded Feb. 5, 2010>, 2 pages.
Grant, Michael, et al., "CVX, Matlab Software for Disciplined Convex Programming," <http://www.stanford.edu/~boyd/cvx/, downloaded Feb. 5, 2010>, 2 pages.
Boyd, Stephen, et al. "Review of Convex Optimization," Internet Article, <http://www.cambridge.org/us/catalogue/catalogue.asp?isbn=0521833787>, Cambridge University Press, XP-002531694, Apr. 8, 2004, pp. 1-2.
Opera Software, "Opera's Small-Screen Rendering ™," <http://web.archive.org/web/20040207115650/http://www.opera.com/products/smartphone/smallscreen/>, downloaded Feb. 25, 2010, pp. 1-4.
"AT&T Natural Voices" website, <http://web.archive.org/web/20060318161559/http://www.nextup.com/attnv.html>, downloaded Feb. 25, 2010, pp. 1-3.
Erol, B., et al., "Multimedia Thumbnails for Documents," Proceedings of the MM'06, XP-002486044, [Online] URL: <http://www.stanford.edu/{sidj/papers/mmthumbs_acm.pdf>, ACM 1-59593-447-2/06/0010, Santa Barbara, California, Oct. 23-27, 2006, pp. 231-240.
Adobe, "PDF Access for Visually Impaired," <http://web.archive.org/web/20040516080951/http://www.adobe.com/support/salesdocs/10446.htm>, downloaded May 17, 2010, 2 pages.
"FestVOX," <http://festvox.org/voicedemos.html>, downloaded May 6, 2010, 1 page.
Japanese Application No. 2007-056061, Office Action, Date Stamped Sep. 3, 2011, 2 pages [Japanese Translation].

* cited by examiner

METHODS FOR SCANNING, PRINTING, AND COPYING MULTIMEDIA THUMBNAILS

A portion of the disclosure of this patent document contains material which is subject to (copyright or mask work) protection. The (copyright or mask work) owner has no objection to the facsimile reproduction by anyone of the patent document or the patent disclosure, as it appears in the Patent and Trademark Office patent file or records, but otherwise reserves all (copyright or mask work) rights whatsoever.

RELATED APPLICATIONS

This application is related to the co-pending U.S. patent application Ser. No. 11/018,231, entitled "Creating Visualizations of Documents," filed on Dec. 20, 2004; U.S. patent application Ser. No. 11/332,533, entitled "Methods for Computing a Navigation Path," filed on Jan. 13, 2006; U.S. patent application Ser. No. 11/689,382, entitled "Methods for Converting Electronic Content Descriptions," filed on Mar. 21, 2007; and U.S. patent application Ser. No. 11/689,394, entitled, "Methods for Authoring and Interacting with Multimedia Representations of Documents," filed on Mar. 21, 2007, assigned to the corporate assignee of the present invention.

FIELD OF THE INVENTION

The present invention is related to processing and presenting documents; more particularly, the present invention is related to scanning, printing, and copying a document in such a way as to have audible and/or visual information in the document identified and have audible information synthesized to play when displaying a representation of a portion of the document.

BACKGROUND OF THE INVENTION

With the increased ubiquity of wireless networks, mobile work, and personal mobile devices, more people browse and view web pages, photos, and even documents using small displays and limited input peripherals. One current solution for web page viewing using small displays is to design simpler, low-graphic versions of web pages. Photo browsing problems are also partially solved by simply showing a low resolution version of photos and giving the user the ability to zoom in and scroll particular areas of each photo.

Browsing and viewing documents, on the other hand, is a much more challenging problem. Documents may be multi-page, have a much higher resolution than photos (requiring much more zooming and scrolling at the user's side in order to observe the content), and have highly distributed information (e.g., focus points on a photo may be only a few people's faces or an object in focus where a typical document may contain many focus points, such as title, authors, abstract, figures, references). The problem with viewing and browsing documents is partially solved for desktop and laptop displays by the use of document viewers and browsers, such as Adobe Acrobat (www.adobe.com) and Microsoft Word (www.microsoft.com). These allow zooming in a document, switching between document pages, and scrolling thumbnail overviews. Such highly interactive processes can be acceptable for desktop applications, but considering that mobile devices (e.g., phones and PDAs) have limited input peripherals, with limited input and smaller displays, a better solution for document browsing and viewing is needed for document browsing on these devices.

Ricoh Innovations of Menlo Park, Calif. developed a technology referred to herein as SmartNail Technology. SmartNail Technology creates an alternative image representation adapted to given display size constraints. SmartNail processing may include three steps: (1) an image analysis step to locate image segments and attach a resolution and importance attribute to them, (2) a layout determination step to select visual content in the output thumbnail, and (3) a composition step to create the final SmartNail image via cropping, scaling, and pasting of selected image segments. The input, as well as the output of SmartNail processing, is a still image. All information processed during the three steps results in static visual information. For more information, see U.S. patent application Ser. No. 10/354,811, entitled "Reformatting Documents Using Document Analysis Information," filed Jan. 29, 2003, published Jul. 29, 2004 (Publication No. US 2004/0146199 A1); U.S. patent application Ser. No. 10/435,300, entitled "Resolution Sensitive Layout of Document Regions," filed May 9, 2003, published Jul. 29, 2004 (Publication No. US 2004/0145593 A1); and U.S. patent application Ser. No. 11/023,142, entitled "Semantic Document Smartnails," filed on Dec. 22, 2004, published Jun. 22, 2006 (Publication No. US 2006-0136491 A1).

Web page summarization, in general, is well-known in the prior art to provide a summary of a webpage. However, the techniques to perform web page summarization are heavily focused on text and usually does not introduce new channels (e.g., audio) that are not used in the original web page. Exceptions include where audio is used in browsing for blind people as is described below and in U.S. Pat. No. 6,249,808.

Maderlechner et al. discloses first surveying users for important document features, such as white space, letter height, etc and then developing an attention based document model where they automatically segment high attention regions of documents. They then highlight these regions (e.g., making these regions print darker and the other regions more transparent) to help the user browse documents more effectively. For more information, see Maderlechner et al., "Information Extraction from Document Images using Attention Based Layout Segmentation." Proceedings of DLIA, pp. 216-219, 1999.

At least one technique in the prior art is for non-interactive picture browsing on mobile devices. This technique finds salient, face and text regions on a picture automatically and then uses zoom and pan motions on this picture to automatically provide close ups to the viewer. The method focuses on representing images such as photos, not document images. Thus, the method is image-based only, and does not involve communication of document information through an audio channel. For more information, see Wang et al., "MobiPicture—Browsing Pictures on Mobile Devices," ACM MM'03, Berkeley, November 2003 and Fan et al., "Visual Attention Based Image Browsing on Mobile Devices," International Conference on Multimedia and Exp. vol. 1, pp. 53-56, Baltimore, Md., July 2003.

Conversion of documents to audio in the prior art mostly focuses on aiding visually impaired people. For example, Adobe provides a plug-in to Acrobat reader that synthesizes PDF documents to speech. For more information, see Adobe, PDF access for visually impaired, http://www.adobe.com/support/salesdocs/10446.htm. Guidelines are available on how to create an audiocassette from a document for blind or visually impaired people. As a general rule, information that is included in tables or picture captions is included in the audio cassette. Graphics in general should be omitted. For more information, see "Human Resources Toolbox," Mobility International USA, 2002, www.miusa.org/publications/

Hrtoolboxintro.htm. Some work has been done on developing a browser for blind and visually impaired users. One technique maps a graphical HTML document into a 3D virtual sound space environment, where non-speech auditory cures differentiate HTML documents. For more information, see Roth et al, "Auditory browser for blind and visually impaired users." CHI'99, Pittsburgh, Pa., May 1999. In all the applications for blind or visually impaired users, the goal appears to be transforming as much information as possible into the audio channel without having necessarily constraints on the channel and giving up on the visually channel completely.

Other prior art techniques for use in conversion of messages includes U.S. Pat. No. 6,249,808, entitled "Wireless Delivery of Message Using Combination of Text and Voice," issued Jun. 19, 2001. As described therein, in order for a user to receive a voicemail on a handheld device, a voicemail message is converted into a formatted audio voicemail message and formatted text message. The portion of the message that is converted to text fills the available screen on the handheld device, while the remainder of the message is set as audio.

SUMMARY OF THE INVENTION

A method, apparatus and article of manufacture for creating visualizations of documents are described. In one embodiment, the method comprises receiving an electronic visual, audio, or audiovisual content; generating a display for authoring a multimedia representation of the received electronic content; receiving user input, if any, through the generated display; and generating a multimedia representation of the received electronic content utilizing received user input.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

Figure 1:
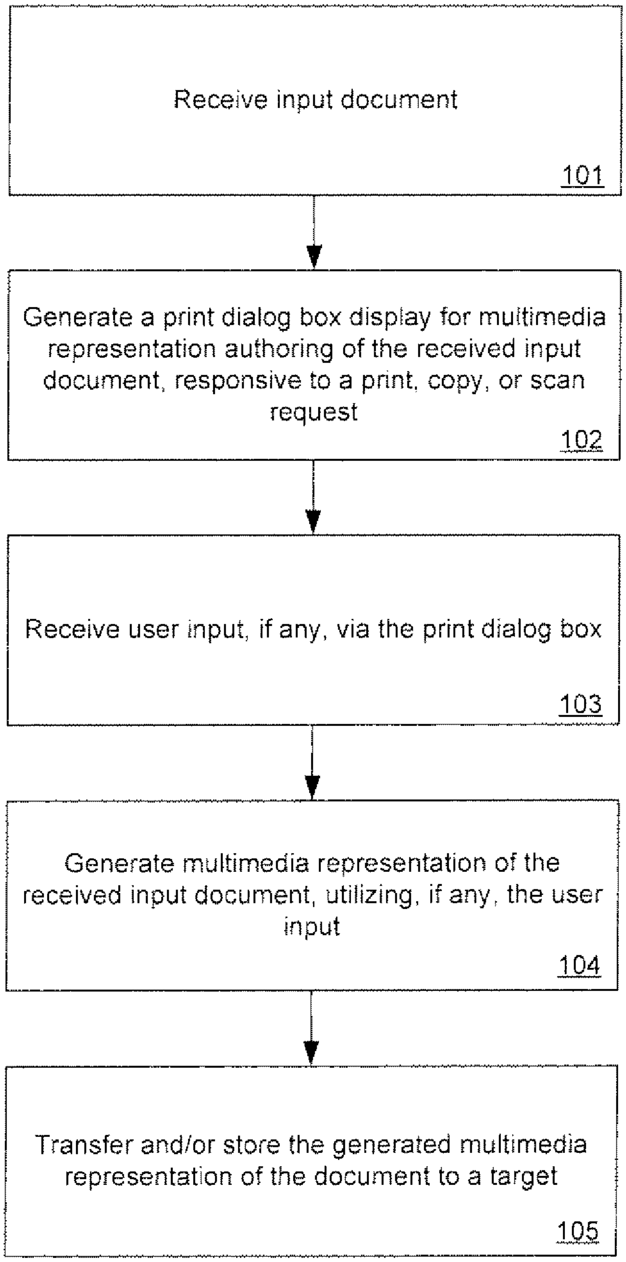
FIG. 1 is a flow diagram of one embodiment of a process for printing, copying, or scanning a multimedia representation of a document.

A method and apparatus for scanning, printing, and copying multimedia overviews of documents, referred to herein as Multimedia Thumbnails (MMNails), are described. The techniques represent multi-page documents on devices with small displays via utilizing both audio and visual channels and spatial and temporal dimensions. It can be considered an automated guided tour through the document.

In one embodiment, MMNails contain the most important visual and audible (e.g., keywords) elements of a document and present these elements in both the spatial domain and the time dimension. A MMNail may result from analyzing, selecting and synthesizing information considering constraints given by the output device (e.g., size of display, limited image rendering capability) or constraints on an application (e.g., limited time span for playing audio).

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks. CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., earner waves, infrared signals, digital signals, etc.); etc.

Overview

A printing, scanning, and copying scheme is set forth below that takes visual, audible, and audiovisual elements of a received document and based on the time and information content (e.g., importance) attributes, and time, display, and application constraints, selects a combination and navigation path of the document elements. In so doing, a multimedia representation of the document may be created for transfer to a target storage medium or target device.

FIG. 1 is a flow diagram of one embodiment of a process for printing, copying, or scanning a multimedia representation of a document. The process is performed by processing logic that may comprise hardware (e.g., circuitry, dedicated logic, etc.), software (such as is run on a general purpose computer system or a dedicated machine), or a combination of both.

Referring to FIG. 1, the process begins by processing logic receiving a document (processing block 101). The term "document" is used in a broad sense to represent any of a variety of electronic visual and/or audio compositions, such as, but not limited to, static documents, static images, real-time rendered documents (e.g., web pages, wireless application protocol pages, Microsoft Word documents, SMIL files, audio and video files, etc.), presentation documents (e.g., Excel Spreadsheets), non-document images (e.g., captured whiteboard image, scanned business cards, posters, photographs, etc.), documents with inherent time characteristics (e.g., newspaper articles, web logs, list serve discussions, etc.), etc. Furthermore, the received document may be a combination of two or more of the various electronic audiovisual compositions. For purposes herein, electronic audiovisual compositions are electronic visual and/or audio composition. For ease of discussion, electronic audiovisual compositions shall be referred to collectively as "documents."

With the received document, processing logic generates a print dialog box display for the authoring a multimedia representation of the received document, responsive to any of a print, copy, or scan request (processing block 102). The print request may be generated in response to the pushing of a print button display on a display (i.e. initiating printing) to send the document to a printing process. A discussion of each of printing, copying, and scanning is provided below. In one embodiment, the print dialog box includes user selectable options and an optional preview of the multimedia representation to be generated.

Processing logic then receives user input, if any, via the displayed print dialog box (processing block 103). The user input received via the print dialog box may include one or more of size and timing parameters for the multimedia thumbnail to be generated, display constraints, target output device, output media, printer settings, etc.

Upon receiving the user input, processing logic generates a multimedia representation of the received document, utilizing the received user input (processing block 104). In one embodiment, processing logic composes the multimedia representation by outputting a navigation path by which the set of one or more of the audible, visual and audiovisual document elements are processed when creating the multimedia representation. A navigation path defines how audible, visual, and audiovisual elements are presented to the user in a time dimension in a limited display area. It also defines the transitions between such elements. A navigation path may include ordering of elements with respect to start time, locations and dimensions of document elements, the duration of focus of an element, the transition type between document elements (e.g., pan, zoom, fade-in), and the duration of transitions, etc. This may include reordering the set of the audible, visual and audiovisual document elements in reading order. The generation and composition of a multimedia representation of a document, according to an embodiment, is discussed in greater detail below.

Processing logic then transfers and/or stores the generated multimedia thumbnail representation of the input document to a target (processing block 105). The target of a multimedia representation, according to embodiments discussed herein, may include a receiving device (e.g., a cellular phone, palmtop computer, other wireless handheld devices, etc.), printer driver, or storage medium (e.g., compact disc, paper, memory card, flash drive, etc.), network drive, mobile device, etc.

Obtaining Audible, Visual and Audiovisual Document Elements

In one embodiment, the audible, visual and audiovisual document elements are created or obtained using an analyzer, optimizer, and synthesizer (not shown).

Analyzer

The analyzer receives a document and may receive metadata. Documents, as referred to herein, may include any electronic audiovisual composition. Electronic audiovisual compositions include, but are not limited to, real-time rendered documents, presentation documents, non-document images, and documents with inherent timing characteristics. For a detailed discussion of how various electronic audiovisual compositions are transformed into multimedia overviews, such as multimedia thumbnails or navigation paths, see U.S. patent application Ser. No. TBD, entitled "Method for Converting Electronic Document Descriptions," filed TBD, published TBD. However, for ease of discussion and to avoid obscuring the present invention, all electronic audiovisual compositions will be referred to as "documents."

In one embodiment, the metadata may include author information and creation data, text (e.g., in a pdf file format where the text may be metadata and is overlayed with the document image), an audio or video stream, URLs, publication name, date, place, access information, encryption information, image and scan resolution, MPEG-7 descriptors etc. In response to these inputs, the analyzer performs pre-processing on these inputs and generates outputs information indicative of one or more visual focus points in the document, information indicative of audible information in the document, and information indicative of audiovisual information in the document. If information extracted from a document element is indicative of visual and audible information, this element is a candidate for an audiovisual element. An application or user may determine the final selection of audiovisual element out of the set of candidates. Audible and visual information in the audiovisual element may be synchronized (or not). For example, an application may require figures in a document and their captions to be synchronized. The audible information may be information that is important in the document and/or the metadata.

In one embodiment, the analyzer comprises a document pre-processing unit, a metadata pre-processing unit, a visual focus points identifier, important audible document information identifier and an audiovisual information identifier. In one embodiment, the document pre-processing unit performs one or more of optical character recognition (OCR), layout analysis and extraction, JPEG 2000 compression and header extraction, document flow analysis, font extraction, face detection and recognition, graphics extraction, and music notes recognition, which is performed depending on the application. In one embodiment, the document pre-processing unit includes Expervision OCR software (www.expervision.com) to perform layout analysis on characters and generates bounding boxes and associated attributes, such as font size and type. In another embodiment, bounding boxes of text zones and associated attributes are generated using ScanSoft software (www.nuance.com). In another embodiment, a semantic analysis of the text zone is performed in the manner described in Aiello M, Monz, C, Todoran, L., Worring, M., "Document Understanding for a Broad Class of Documents," International Journal on Document Analysis and Recognition (IJDAR), vol. 5(1), pp. 1-16, 2002, to determine semantic attributes such as, for example, title, heading, footer, and figure caption.

The metadata pre-processing unit may perform parsing and content gathering. For example, in one embodiment, the metadata preprocessing unit, given an author's name as metadata, extracts the author's picture from the world wide web (WWW) (which can be included in the MMNail later). In one embodiment, the metadata pre-processing unit performs XML parsing.

After pre-processing, the visual focus points identifier determines and extracts visual focus segments, while the important audible document information identifier determines and extracts important audible data and the audiovisual information identifier determines and extracts important audiovisual data.

In one embodiment, the visual focus points identifier identifies visual focus points based on OCR and layout analysis results from pre-processing unit and/or a XML parsing results from pre-processing unit.

In one embodiment, the visual focus points (VTP) identifier performs analysis techniques set forth in U.S. patent application Ser. No. 10/435,300, entitled "Resolution Sensitive Layout of Document Regions," filed May 9, 2003, published Jul. 29, 2004 (Publication No. US 2004/0145593 A1) to identify text zones and attributes (e.g., importance and resolution attributes) associated therewith. Text zones, may include a title and captions, which are interpreted as segments. In one embodiment, the visual focus points identifier determines the title and figures as well. In one embodiment, figures are segmented.

In one embodiment, the audible document information (ADI) identifier identifies audible information in response to OCR and layout analysis results from the pre-processing unit and/or XML parsing results from the pre-processing unit.

Examples of visual focus segments include figures, titles, text in large fonts, pictures with people in them, etc. Note that these visual focus points may be application dependent. Also, attributes such as resolution and saliency attributes are associated with this data. The resolution may be specified as metadata. In one embodiment, these visual focus segments are determined in the same fashion as specified in U.S. patent application Ser. No. 10/435,300, entitled "Resolution Sensitive Layout of Document Regions," filed May 9, 2003, published Jul. 29, 2004 (Publication No. US 2004/0145593 A1). In another embodiment, the visual focus segments are determined in the same manner as described in Le Meur, O., Le Callet, P., Barba, D., Thoreau, D., "Performance assessment of a visual attention system entirely based on a human vision modeling," Proceedings of ICIP 2004, Singapore, pp. 2327-2330, 2004. Saliency may depend on the type of visual segment (e.g., text with large fonts may be more important than text with small fonts, or vice versa depending on the application). The importance of these segments may be empirically determined for each application prior to MMNail generation. For example, an empirical study may find that the faces in figures and small text are the most important visual points in an application where the user assess the scan quality of a document. The salient points can also be found by using one of the document and image analysis techniques in the prior art.

Examples of audible information include titles, figure captions, keywords, and parsed meta data. Attributes, e.g., information content, relevance (saliency) and time attributes (duration after synthesizing to speech) are also attached to the audible information. Information content of audible segments may depend on its type. For example, an empirical study may show that the document title and figure captions are the most important audible information in a document for a "document summary application".

Some attributes of VFPs and ADIs can be assigned using cross analysis. For example, the time attribute of a figure (VFP) can be assigned to be the same as the time attribute of the figure caption (ADI).

In one embodiment, the audible document information identifier performs Term Frequency-Inverse Document Frequency (TFIDF) analysis to automatically determine keywords based on frequency, such as described in Matsuo, Y., Ishizuka, M. "Keyword Extraction from a Single Document using Word Co-occurrence Statistical Information," International Journal on Artificial Intelligence Tools, vol. 13, no. 1, pp. 157-169, 2004 or key paragraphs as in Fukumoto, F., Suzuki, Y., Fukumoto, J., "An Automatic Extraction of Key Paragraphs Based on Context Dependency," Proceedings of Fifth Conference on Applied Natural Language Processing, pp. 291-298, 1997, For each keyword, the audible document information identifier computes a time attribute as being the time it takes for a synthesizer to speak that keyword.

In a similar fashion, the audible document information identifier computes time attributes for selected text zones, such as, for example, title, headings, and figure captions. Each time attribute is correlated with its corresponding segment. For example, the figure caption time attribute is also correlated with the corresponding figure segment. In one embodiment, each audible information segment also carries an information content attribute that may reflect the visual importance (based on font size and position on a page) or reading order in case of text zone, the frequency of appearance in the case of keywords, or the visual importance attribute for figures and related figure captions. In one embodiment, the information content attribute is calculated in the same way as described in U.S. patent application Ser. No.

10/435,300, entitled "Resolution Sensitive Layout of Document Regions," filed May 9, 2003, published Jul. 29, 2004 (Publication No. US 2004/0145593 A1).

Audiodivisional document information (AVDI) is information extracted from audiovisual elements.

Thus, in one embodiment, using an electronic version of a document (not necessarily containing video or audio data) and its metadata, visual focus points (VFPs), important audible document information (ADIs), and audiovisual document information (AVDI) may be determined.

The visual focus segments, important audible information, and audiovisual information are given to the optimizer. Given the VFPs and the ADI, AVDI along with device and application constraints (e.g., display size, a time constraint), the optimizer selects the information to be included in the output representation (e.g., a multimedia thumbnail). In one embodiment, the selection is optimized to include the preferred visual and audible and audiovisual information in the output representation, where preferred information may include important information in the document, user preferred, important visual information (e.g., figures), important semantic information (e.g., title), key paragraphs (output of a semantic analysis), document context. Important information may include resolution sensitive areas of a document. The selection is based on computed time attributes and information content (e.g., importance) attributes.

Optimizer

The optimization of the selection of document elements for the multimedia representation generally involve spatial constraints, such as optimizing layout and size for readability and reducing spacing. In such frameworks, some information content (semantic, visual) attributes are commonly associated with document elements. In the framework described herein, in one embodiment, both the spatial presentation and time presentation are optimized. To that end, "time attributes" are associated with document elements. In the following sections, the assignment, of time attributes for audible, visual, and audiovisual document elements are explained in detail.

With respect to document elements, information content, or importance, attributes are assigned to audio, visual, and audiovisual elements. The information content attributes are computed for different document elements.

Some document elements, such as title, for example, can be assigned fixed attributes, while others, such as, for example, figures, can be assigned content dependent importance attributes.

Information content attributes are either constant for an audio or visual element or computed from their content. Different sets of information content values may be made for different tasks, such as in the cases of document understanding and browsing tasks. These are considered as application constraints.

In one embodiment, in response to visual and audible information segments and other inputs such as the display size of the output device and the time span, T, which is the duration of final multimedia thumbnail, the optimizer performs an optimization algorithm.

The main function of the optimization algorithm is to first determine how many pages can be shown to the user, given each page is to be displayed on the display for predetermined period of time (e.g., 0.5 seconds), during the time span available.

In one embodiment, the optimizer then applies a linear packing/filling order approach in a manner well-known in the art to the sorted time attributes to select which figures will be included in the multimedia thumbnail. Still-image holding is applied to the selected figures of the document. During the occupation of the visual channel by image holding, the caption is "spoken" in the audio channel. After optimization, the optimizer re-orders the selected visual, audio and audiovisual segments with respect to the reading order.

Other optimizers may be used to maximize the joined communicated information in time span L and in the visual display of constrained size. For examples of optimizer implementations, see "Methods for Computing a Navigation Path," filed on Jan. 13, 2006, U.S. patent application Ser. No. 11/332,533, incorporated herein by reference.

An Example of an Optimization Scheme

Figure 6:
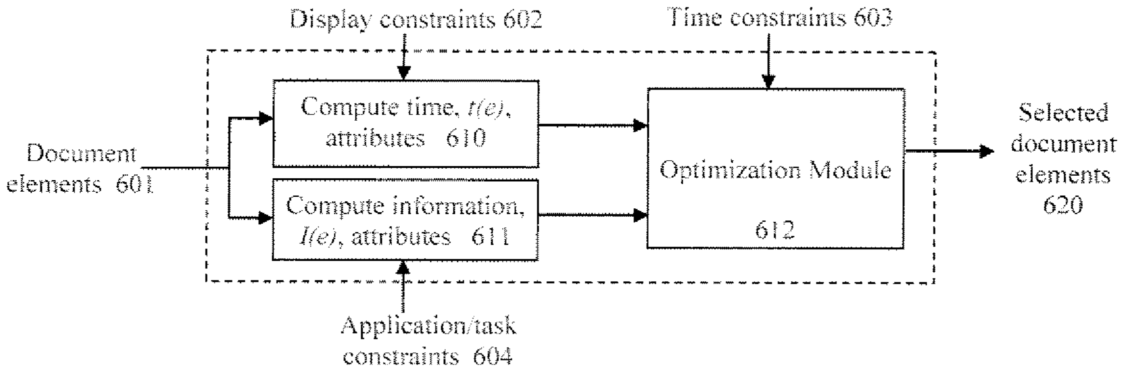
FIG. 6 is a block diagram of one embodiment of an optimizer.

The optimizer selects document elements to form an MMNail based on time, application, and display size constraints. An overview of one embodiment of an optimizer is presented in FIG. 6. Referring to FIG. 6, first, for each document element 600 a time attribute is computed (610), i.e. time required to display the element, and an information attribute is computed (611), i.e. information content of the element. Display constraints 602 of the viewing device are taken into account when computing time attributes. For example, it takes longer time to present a text paragraph in a readable form in a smaller viewing area. Similarly, target application and task requirements 604 need to be taken into account when computing information attributes. For example, for some tasks the abstract or keyword elements can have higher importance than other elements such as a body text paragraph.

In one embodiment, the optimization module 612 maximizes the total information content of the selected document elements given a time constraint (603). Let the information content of an element e be denoted by I(e), the time required to present e by t(e), the set of available document elements by E, and the target MMNail duration by T. The optimization problem is $$\text{maximize} \sum_{e \in E} x(e)I(e) \tag{1}$$

$$\text{subject to} \sum_{e \in E} x(e)t(e) \leq T$$

$$x(e) \in \{0, 1\}, e \in E,$$

where the optimization variables x(e) determine inclusion of elements, such that x(e)=1 means e is selected to be included in the MMNail and x(e)=0 means e is not selected.

The problem (1) is a '0-1 knapsack' problem, therefore it is a hard combinatorial optimization problem. If the constraints $x(e) \in \{0,1\}$ to $0 \leq x(e) \leq 1$, $e \in E$ are relaxed, then the problem (1) becomes a linear program, and can be solved very efficiently. In fact, in this case, a solution to the linear program can be obtained by a simple algorithm such as described in R. L. Rivest, H. H. Cormen, C. E. Leiserson, Introduction to Algorithms, MIT Pres, MC-Graw-Hill, Cambridge Mass. 1997.

Let $x^*(e)$, $e \in E$, be a solution to the linear program. The algorithm is:

1. Sort the elements $e \in E$ according to the ratio I(e).t(e) in descending order, i.e., $$\frac{I(e_1)}{t(e_1)} \geq \ldots \geq \frac{I(e_m)}{t(e_m)},$$

where m is the number of elements in E;

2. Starting with the element $e_1$ select elements in increasing order ($e_1$, $e_2$, . . . ) while the sum of the time attributes of selected elements is smaller or equal T. Stop when no element can be added anymore such that the sum of time attributes of the selected elements is smaller or equal T.

3. If element e is selected denote it by x*(e)=1, otherwise if it is not selected denote it by x*(e)=0.

For practical purposes, approximation of the problem (1) should work quite well, as the individual elements are expected to have much shorter display time than the total MMNail duration.

Time Attributes

The time attribute, t(e), of a document element e can be interpreted as the approximate duration that is sufficient for a user to comprehend that element. Computation of time attributes depends on the type of the document element.

The time attribute for a text document element (e.g., title) is determined to be the duration of the visual effects necessary to show the text segment to the user at a readable resolution. In experiments, text was determined to be at least 6 pixels high in order to be readable on an LCD (Apple Cinema) screen. If text is not readable once the whole document is fitted into the display area (i.e. in a thumbnail view), a zoom operation is performed. If even zooming into the text such that the entire text region still fits on the display is not sufficient for readability, then zooming into a part of the text is performed. A pan operation is carried out in order to show the user the remainder of the text. In order to compute time attributes for text elements, first the document image is down-sampled to fit the display area. Then a zoom factor Z(e) is determined as the factor that is necessary to scale the height of the smallest font in the text to the minimum readable height. Finally, the time attribute for a visual element e that contains text is computed as $$t(e) = \begin{bmatrix} SSC \times n_e, & Z(e) = 1 \\ SSC \times n_e + Z_c, & Z(e) > 1 \end{bmatrix}, \quad (2)$$

where $n_e$ is number of characters in e, $Z_C$ is zoom time (in our implementation this is fixed to be 1 second), and SSC (Speech Synthesis Constant) is the average time required to play back the synthesized audio character. SSC is computed as follows.

1. Synthesize a text segment containing k characters,
2. Measure the total time it takes for the synthesized speech to be spoken out, $\tau$, and
3. Compute SSC=$\tau$/k.

The SSC constant may change depending on the language choice, synthesizer that is used, and the synthesizer options (female vs. male voice, accent type, talk speed, etc). Using the AT&T speech SDK (AT&T Natural Voices Speech SDK, http://www.naturalvoices.att.com/), SSC is computed to be equal to 75 ms when a female voice was used. The computation of t(e) remains the same even if an element cannot be shown with one zoom operation and both zoom and pan operations are required. In such cases, the complete presentation of the element consists of first zooming into a portion of the text, for example the first me out of a total of $n_e$ characters, and keeping the focus on the text for SSCx$m_e$ seconds. Then the remainder of the time, i.e. SSCx($n_e$−$m_e$) is spent on the pan operation.

The time attribute for an audible text document element e, e.g. a keyword, is computed as $$t(e)=SSC \times n_e, \quad (3)$$

where SSC is the speech synthesis constant and $n_e$ is the number of characters in the document element.

For computing time attributes for figures without any captions, we make the assumption that complex figures take a longer time to comprehend. The complexity of a visual figure element e is measured by the figure entropy H(e) that is computed extracting bits from a low-bitrate layer of the JPEG2000 compressed image as described in U.S. patent application Ser. No. 10/044,420, entitled "Header-Based Processing of Images Compressed Using Multi-Scale Transforms," filed Jan. 10, 2002, published Sep. 4, 2003 (U.S. Publication No. US 2003-0165273 A1).

Time attribute for a figure element is computed as t(e)= $\alpha H(e)/\overline{H}$, where H(e) is the figure entropy, $\overline{H}$ is the mean entropy, and $\alpha$ is a time constant. $\overline{H}$ is empirically determined by measuring the average entropy for a large collection of document figures. The time required to comprehend a photo might be different than that of a graph or a table, therefore, different $\alpha$ can be used for these different figure types. Moreover, high level content analysis, such as face detection, can be applied to assign time attributes to figures. In one embodiment, $\alpha$ is fixed to 4 seconds, which is the average time a user spends on a figure in our experiments.

An audiovisual element e is composed of an audio component, A(e), and a visual component, V(e). A time attribute for an audiovisual element is computed as the maximum of time attributes for its visual and audible components: t(e)=max(t(V(e)),t(A(e))), where t(V(e)) is computed as in (2) and t(A(e)) as in (3). For example, t(e) of a figure element is computed as the maximum of time required to comprehend the figure and the duration of synthesized figure caption.

Information Attributes

An information attribute determines how much information a particular document element contains for the user. This depends on the user's viewing/browsing style, target application, and the task on hand. For example, information in the abstract could be very important if the task is to understand the document, but it may not be as important if the task is merely to determine if the document has been seen before.

TABLE 1

Percentage of users who viewed different parts of the documents for document search and understanding tasks.

| Document Part | Viewing percentage for search task | Viewing percentage for understanding task |
|---|---|---|
| Title | 83% | 100% |
| Abstract | 13% | 87% |
| Figures | 38% | 93% |
| First page thumbnail | 83% | 73% |
| References | 8% | 13% |
| Publication name | 4% | 7% |
| Publication date | 4% | 7% |

Table 1 shows the percentage of users who viewed various document parts when performing the two tasks in a user study. This study gave an idea about how much users value different document elements. For example, 100% of the users read the title in the document understanding task, whereas very few users looked at the references, publication name and the date. In one embodiment, these results were used to assign information attributes to text elements. For example, in the document understanding task, the title is assigned the information value of 1.0 based on 100% viewing, and references are given the value 0.13 based on 13% viewing.

Two-Stage Optimization

After the time and the information attributes are computed for the visual, audible, and audiovisual elements, the optimizer of FIG. 6 produces the best thumbnail by selecting a combination of elements. The best thumbnail is one that maximizes the total information content of the thumbnail and can be displayed in the given time.

A document element e belongs to either the set of purely visual elements $E_v$, the set of purely audible elements $E_a$, or the set of synchronized audiovisual elements $E_{av}$. A Multimedia Thumbnail representation has two presentation channels, visual and audio. Purely visual elements and purely audible elements can be played simultaneously over the visual and audio channel, respectively. On the other hand, displaying a synchronized audiovisual element requires both channels. In one embodiment, the display of any synchronized audiovisual element does not coincide with the display of any purely visual or purely audible element at any time.

Figure 7:
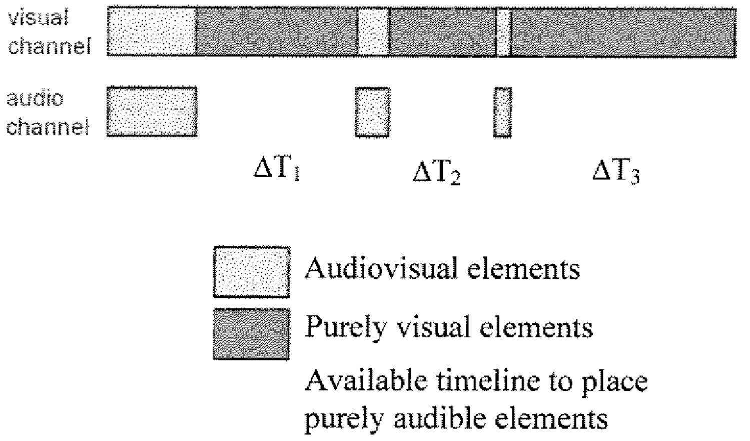
FIG. 7 illustrates audio and visual channels after the first stage of the optimization where some parts of the audio channel are not filled.

One method to produce the thumbnail consists of two stages. In the first stage, purely visual and synchronized audiovisual elements are selected to fill the video channel. This leaves the audio channel partially filled. This is illustrated in FIG. 7. In the second stage we select purely audible elements to fill the partially filled audio channel.

The optimization problem of the first stage is $$\begin{aligned}&\text{maximize} \sum_{e\in E_v\cup E_{av}} x(e)I(e)\\&\text{subject to} \sum_{e\in E_v\cup E_{av}} x(e)t(e)\le T\\&x(e)\in\{0,1\},\ e\in E_v\cup E_{av}.\end{aligned} \tag{4}$$

We solve this problem approximately using the linear programming relaxation as shown for the problem (1). The selected purely visual and synchronized audiovisual elements are placed in time in the order they occur in the document. The first stage optimization almost fills the visual channel, and fills the audio channel partially, as shown in FIG. 7.

In the second stage, purely audio elements are selected to fill the audio channel which has separate empty time intervals. Let the total time duration to be filled in the audio channel be $\hat{T}$. If the selected purely audible elements have a total display time of approximately $\hat{T}$, it is difficult to place the elements in the audio channel because the empty time duration $\hat{T}$ is not contiguous. Therefore a conservative approach is taken and optimization is solved for a time constraint of $\beta\hat{T}$, where $\beta\in[0,1]$. Further, only a subset of purely audio elements, $\hat{E}_a$, are considered to be included in the MMNail. This subset is composed of audio elements that have a shorter duration than the average length of the separated empty intervals of the audio channel, i.e., $\hat{E}_a=\{e\in E_a|t(e)\le\gamma\hat{T}/R\}$, where $\gamma\in[0,R]$ and R is the number of separated empty intervals. Therefore, the optimization problem of the second stage becomes $$\begin{aligned}&\text{maximize} \sum_{e\in\hat{E}_a} x(e)I(e)\\&\text{subject to} \sum_{e\in\hat{E}_a} x(e)t(e)\le\beta\hat{T}\\&x(e)\in\{0,1\},\ e\in\hat{E}_a.\end{aligned} \tag{5}$$

The problem is of the type (1) and it is approximately solved using the linear programming relaxation as shown earlier. In our implementation $\beta=\frac{1}{2}$ and $\gamma=1$.

It is possible to formulate a one step optimization problem to choose the visual, audiovisual, and the audible elements simultaneously. In this case, the optimization problem is $$\begin{aligned}&\text{maximize} \sum_{e\in E_a\cup E_v\cup E_{av}} x(e)I(e)\\&\text{subject to} \sum_{e\in E_a\cup E_{av}} x(e)t(e)\le T\\&\sum_{e\in E_v\cup E_{av}} x(e)t(e)\le T\\&x(e)\in\{0,1\},\ e\in E_a\cup E_v\cup E_{av},\end{aligned} \tag{6}$$

where x(e), $e\in E_a\cup E_v\cup E_{av}$, are the optimization variables. The greedy approximation described to solve the relaxed problem (1) will not work to solve this optimization problem, but the problem can be relaxed and any generic linear programming solver can be applied. The advantage of solving the two stage optimization problem is that inclusion of user or system preferences into the allocation of the audio becomes independent of the information attributes of the visual elements and allocation of the visual channel.

Note that the two stage optimization described herein gives selection of purely visual elements strict priority over that of purely audible elements. If it is desired that audible elements have priority over visual elements, the first stage of the optimization can be used to select audiovisual and purely audible elements, and the second stage is used to optimize selection of purely visual elements.

Synthesizer

As discussed above, the optimizer receives the output from an analyzer, which includes the characterization of the visual and audible document information, and device characteristics, or one or more constraints (e.g., display size, available time span, user settings preference, and power capability of the device), and computes a combination of visual and audible information that meets the device constraints and utilizes the capacity of information deliverable through the available output visual and audio channels. In this way, the optimizer operates as a selector, or selection mechanism.

After selection, a synthesizer composes the final multimedia thumbnail. In one embodiment, the synthesizer composes the final multimedia thumbnail by executing selected multimedia processing steps determined in the optimizer. In one embodiment, the synthesizer receives a file, such as, for example, a plain text file or XML file, having the list of processing steps. In another embodiment, the list of processing steps may be sent to the synthesizer by some other means such as, for example, through socket communication or com object communication between two software modules. In yet another embodiment, the list of processing steps is passed as function parameters if both modules are in the same software. The multimedia processing steps may include the "traditional" image processing steps crop, scale, and paste, but also steps including a time component such as page flipping, pan, zoom, and speech and music synthesis.

In one embodiment, the synthesizer comprises a visual synthesizer, an audio synthesizer, and a synthesizer/composer. The synthesizer uses the visual synthesis to synthesize the selected visual information into images and a sequence of images, the audio synthesizer to synthesize audible information into speech, and then the synchronizer/composer to synchronize the two output channels (audio and visual) and compose a multimedia thumbnail. Note that the audio portion of the audiovisual element is synthesized using the same speech synthesizer used to synthesize the audible information.

In one embodiment, for the visual composition including sequences of images (without audio) such as zoom and page flipping is performed using Adobe AfterEffects, while the synchronizer/composer uses Adobe Premier. In one embodiment, the audio synthesizer uses CMU speech synthesizing software (FestVox, http://festvox.org/voicedemos.html) to create sound for the audible information.

In one embodiment, the synthesizer does not include the synchronizer/composer. In such a case, the output of the synthesizer may be output as two separate streams, one for audio and one for visual.

The outputs of the synchronizer/composer may be combined into a single file and may be separate audio and video channels.

Multimedia Representation Printing, Scanning, and Copying

Figure 2:
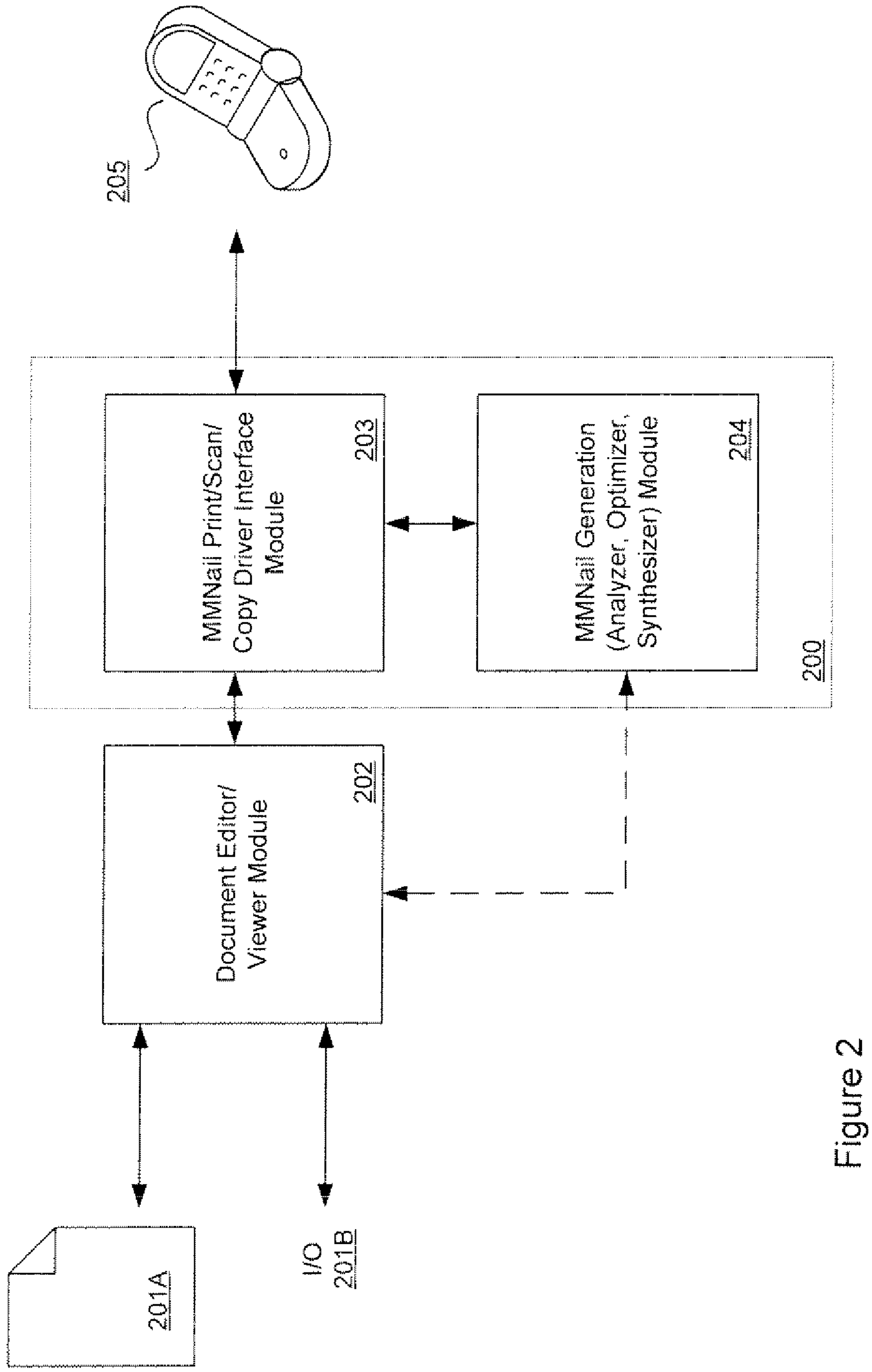
FIG. 2 is a flow diagram of another embodiment of processing components for printing, scanning, or copying multimedia overviews of documents.

FIG. 2 is a flow diagram illustrating another embodiment of processing components for printing, scanning, or copying multimedia overviews of documents. In one embodiment, each of the modules comprises hardware (e.g., circuitry, dedicated logic, etc.), software (such as is run on a general purpose computer system or dedicated machine), or a combination of both.

Referring to FIG. 2, document editor/viewer module 202 receives a document 201A as well as user input/output 201B. As discussed above, document 201A may include any of a real-time rendered document, presentation document, non-document image, a document with inherent timing characteristics, or some combination of document types. Furthermore, user input/output 201B is received by document editor/viewer module 201A. Received user input/output may include a command for a multimedia overview of a document to be composed, user option selection, etc.

After receipt of document 201A by document editor/viewer module 202, and in response to a command 201B that a multimedia overview of a document be composed, document editor/viewer module 202 transmits the request and document 201A to MMNail Print/Scan/Copy Driver Interface Module 203. MMNail Print/Scan/Copy Driver Interface Module 203 displays a print dialog box at module 202 to await user input/output 201B. Through the print dialog box, user preferences are received. Such preferences may include, but are not limited to, target output device, target output media, duration of final multimedia overview, resolution of multimedia overview, as well as exemplary advanced options discussed below.

MMNail Print/Scan/Copy Driver Interface Module 203 then transmits both the document 201A and user preferences 201B to MMNail Generation Module 204. In one embodiment, MMNail Generation Module 204 includes the functions and features discussed in detail above, for composing a multimedia overview of document 201A. Optionally, a print preview command may be received by the print dialog box (not shown) presented via user I/O 201B, in which case output from MMNail Generation Module, i.e., a multimedia overview of document 201A, is displayed via document editor/viewer, print dialog box, or some other display application or device (not shown). MMNail Print/Scan/Copy Driver Interface Module 203 may then receive a print, scan, or copy request via module 202 that an MMNail be composed to represent document 201A. Whether a preview is selected or not, upon receiving a request, at module 203, that an MMNail be generated, document 201A and user preferences received via I/O 201B arc transmitted to MMNail Generation Module 204. MMNail Generation Module then composes a multimedia representation of document 201A, as described above, based on received user preferences.

In one embodiment, the final MM Nail is transmitted by MMNail Print/Scan/Copy Driver Interface Module 203 to a target 205. Note that a target may be selected by MMNail Print/Scan/Copy Drive Interface Module 203 by default, or a preferred target may be received as a user selection. Furthermore, MMNail Interface Module 203 may distribute a final MMnail to multiple targets (not shown). In one embodiment, a target of an MMNail is a cellular telephone, Blackberry, palm top computer, universal resource locator (URL), Compact Disc ROM, PDA, memory device, or other media device. Note also that target 205 need not be limited to a mobile device.

The modules, as illustrated in FIG. 2, do not require the illustrated configuration, as the modules may be consolidated into a single processing module, utilized in a distributed fashion, etc.

Printing

Multimedia thumbnails can be seen as a different medium for the presentation of documents. In one embodiment, any document editor/viewer can print (e.g., transform) a document to an MMNail formatted multimedia representation of the original document. Furthermore, the MMNail formatted multimedia representations can be transmitted, stored on, or otherwise transferred to a storage medium of a target device. In one embodiment, the target device is a mobile device such as a cellular phone, palmtop computer, etc. During the printing processes described above, a user's selection for a target output medium, as well as, MMNail parameters are received via a printer dialog.

Figure 3A:
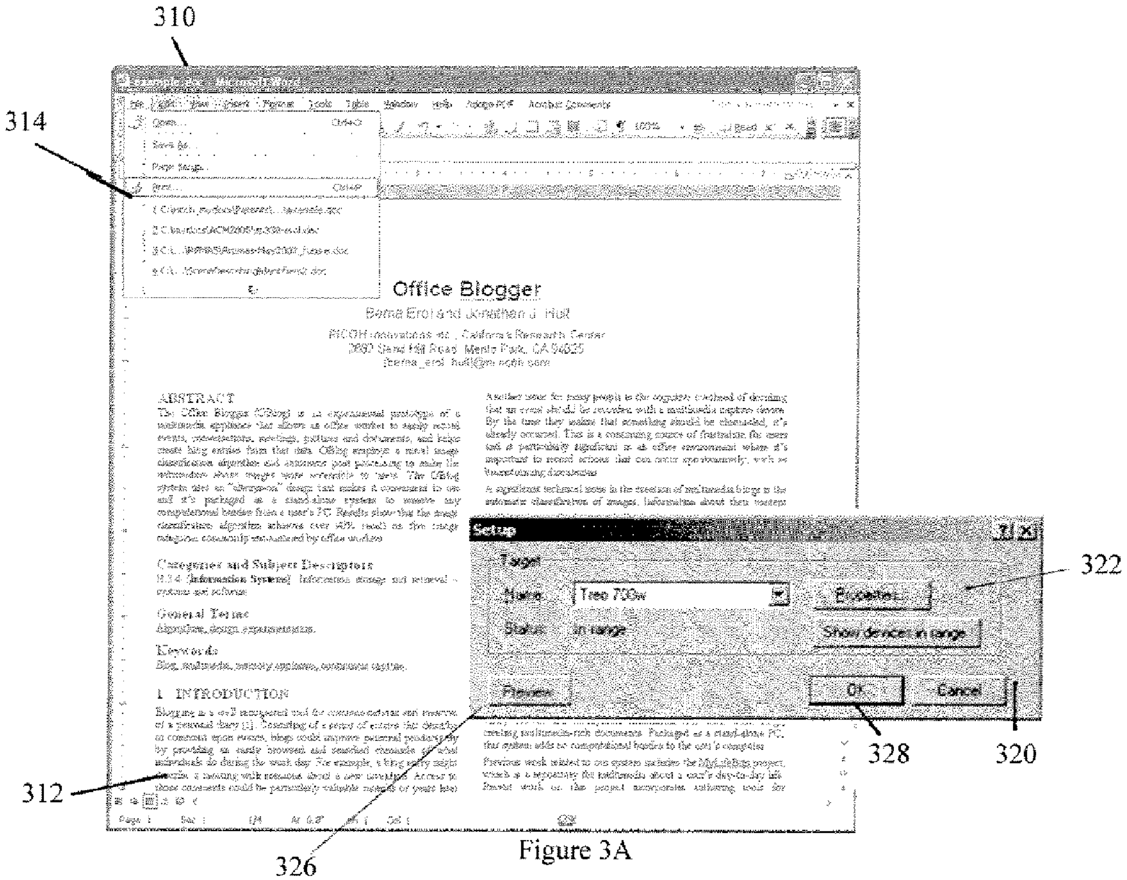
FIG. 3A is a print dialog box interface of one embodiment for printing, copying, or scanning a multimedia representation of a document.

FIG. 3A illustrates an exemplary document editor/viewer 310 and printer dialog box 320. Although a text document 312 is illustrated in FIG. 3A, the methods discussed herein apply to any document type. Upon the document editor/viewer 310 receiving a print command 314, print dialog box 320 is displayed. The print dialog box 320 shows a selection of devices in range part. Depending on what device is selected (e.g., MFP, printer, cellphone), the second display box of FIG. 3B appears and allows the user determine a specific choice for the selected target.

In one embodiment, print dialog box 320 may receive input for selection of a target output medium 322 of a final multimedia overview representative of document 312. Target output medium could be a storage location on a mobile device, local disk, or multi-function peripheral device (MFP), Furthermore, a target output can also include a URL for publishing the final multimedia overview, a printer location, etc. In one embodiment, mobile devices in Bluetooth or Wireless Fidelity (WiFi) range can be automatically detected and added to the target devices list 322 of print dialog box 320.

Figure 3B:
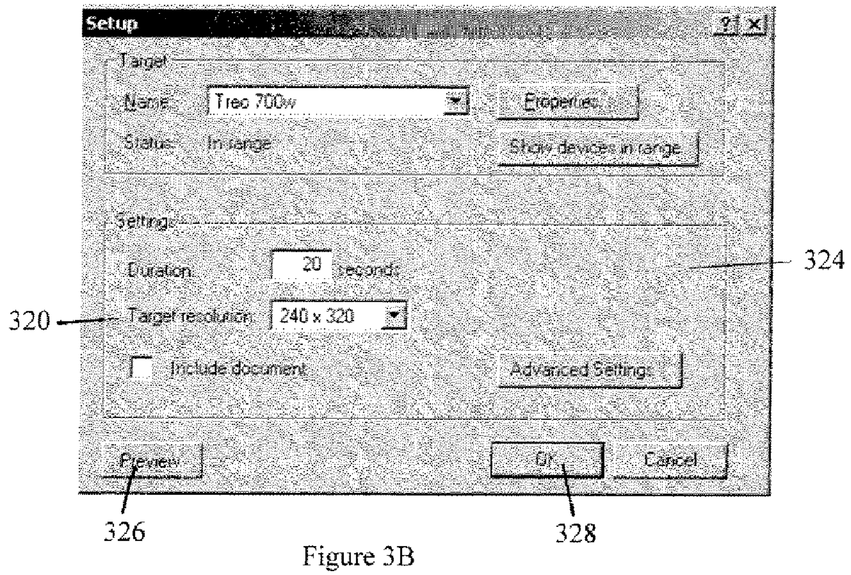
FIG. 3B is another print dialog box interface of one embodiment for printing, copying, or scanning a multimedia representation of a document.

Target duration and spatial resolution for a multimedia overview can be specified in the interface 320 through settings options 324 in FIG. 3B. In one embodiment, these parameters could be utilized by the optimization algorithm, as discussed above, when composing a multimedia thumbnail or navigation path. Some parameters, such as, for example, target resolution, time duration, preference for allocation of audio channel, speech synthesis parameters (language, voice type, etc., automatically populate, or are suggested via, print dialog box 320 based on the selected target device/medium.

With a scalable multimedia overview representation, as will be discussed in greater detail below, a range of durations and target resolutions may be received via print dialog box 320. In one embodiment, a user selectable option may also include whether or not to include the original document with the multimedia representation and/or transmitted together with the final multimedia overview.

Figure 3C:
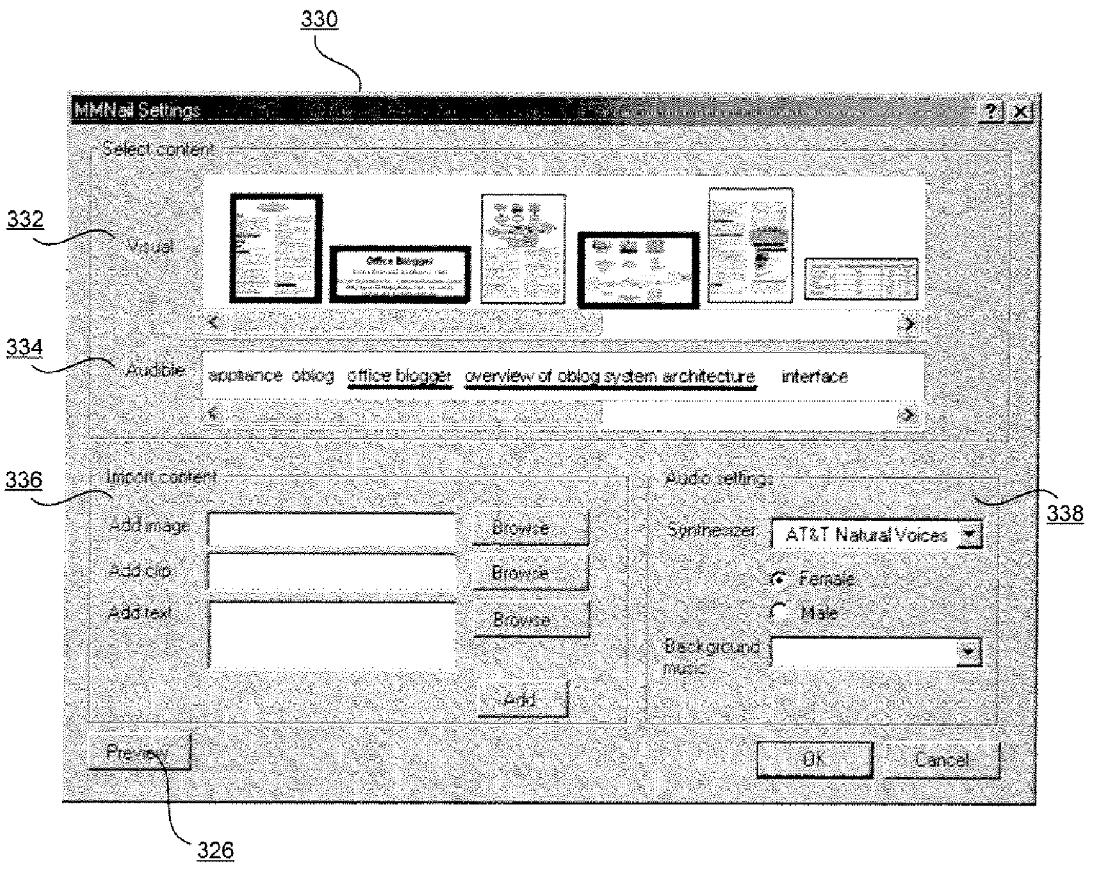
FIG. 3C is another print dialog box interface of one embodiment for printing, copying, or scanning a multimedia representation of a document.

Print dialog box 320 may also receive a command to display advanced settings. In one embodiment a print dialog box displays exemplary advanced settings utilized during multimedia overview composition, as illustrated in FIG. 3C. The advanced settings options may be displayed in the same dialog box, or within a separate dialog box, as that illustrated in FIG. 3A. In a way, these interfaces, which receive user selection to direct the settings for creation of a multimedia thumbnail or navigation path, provide a user with the ability to "author" a multimedia overview of a document. In one embodiment, user selection or de-selection of visual content 332 and audible content 334 to be included in a multimedia overview is received by the print dialog boxes illustrated in FIGS. 3A, 3B and 3C. Similar to the discussion above, print dialog box 330 may be automatically populated with all detected visual and audible document elements, as determined by the multimedia overview composition process, discussed above and as illustrated in FIG. 3C. The visual content elements automatically selected for inclusion into the multimedia representation are highlighted with a different type of borders than the non-selected ones. The same is true for the audio file. By using a mouse (more general "pointing device"), different items in windows 332 and 334 may be selected (e.g., clicking) or de-selected (e.g., clicking on an already selected items).

Received user input may further include various types of metadata 336 and 338 that are included together with a multimedia overview of a document. In one embodiment, metadata includes related relevant content, text, URLs, background music, pictures, etc. In one embodiment, this metadata is received through an importing interface (not shown). In addition to specified content, another advanced option received via print dialog box 330 is a timeline that indicates when (e.g., the timeline) the specified content is presented, and in what order, in a composed multimedia overview.

Received metadata provides an indication as to what is important to present in a multimedia overview of a document, such as specific figures or textual excerpts. Received metadata further specifies the path of a story (e.g., in newspaper), as well as specifying a complete navigation path. For example slides to be included in an MMNail representation of PPT documents) for a multimedia representation.

As illustrated in FIGS. 3A-3C, print dialog box 330 receives a command to preview a multimedia overview of a document, by receiving selection of preview button 326. Alternatively, a real-time preview of a multimedia overview, or navigation path, may be played in the print dialog box of FIG. 3A, 3B, or 3C as user modification to the multimedia overview contents are received.

The creation of a multimedia overview may be dependent on the content selected and/or a received user's identification. For example, MMNail analyzer determines a zoom factor and a pan operation for showing the text region of a document, and to ensure the text is readable at a given resolution. Such requirements may be altered based on a particular user's identification. For example, if a particular user has vision problems, a smallest readable font size parameter used during multimedia overview composition can be set to a higher size, so that the resulting multimedia overview is personalized for the target user.

Upon receiving a "print" request (e.g., a request to transform a document into a multimedia overview), such as by receiving selection of an "OK." button, a multimedia thumbnail is transmitted to the selected device. During printing, a multimedia thumbnail is generated (if not already available within a file) using the methods described in "Creating Visualizations of Documents," filed on Dec. 20, 2004, U.S. patent application Ser. No. 11/018,231, "Methods for Computing a Navigation Path," filed on Jan. 13, 2006, U.S. patent application Ser. No. 11/332,533, and "Methods for Converting Electronic Document Descriptions." filed on TBD, U.S. patent application Ser. No. TBD, and sent to the receiving device/medium via Bluetooth, WiFi, phone service, or by other means. The packaging and file format of a multimedia overview, according to embodiments discussed herein, are described in more detail below.

Scanning

People who scan documents often re-scan the same document more than once. Multimedia thumbnails, as discussed herein, provide an improved preview of a scanned document. In one embodiment, a preview of a multimedia overview is presented on the display of a multi-function peripheral (MFP) device, such as a scanner with integrated display, copier with display, etc., so that desired scan results can be obtained more rapidly through visual inspection. In such an embodiment, the MMNail Generation Module 204 discussed above in FIG. 2, would be included in such an MFP device.

In one embodiment, a multimedia overview resulting from a MFP device scan of a document, would not only show the page margins that were scanned, but also automatically identify the smallest fonts or complex textures of images and zoom into those regions automatically for the user. The results, presented to a user, via the MFPs display would allow the user to determine whether or not the quality of the scan is satisfactory. In one embodiment, a multimedia overview that previews a document scan at an MFP device also shows, as a separate visual channel, the OCR results for potentially problematic document regions based on the scanned image. Thus, the results presented to the user allow the user to decide if he needs to adjust the scan settings to obtain a higher quality scan.

The results of a scan, and optionally the generated multimedia overview of the scanned document, are saved to local storage, portable storage, e-mailed to the user (with or without a multimedia thumbnail representation), etc. Several different types of MMNail representations can be generated at the scanner, for example, one that provides feedback as to potential scan problems and one suitable for content browsing to be included with the scanned document.

In one embodiment, a MFP device, including a scanner, can receive a collection of documents, documents separated, perhaps with color sheet separators, etc. The multimedia over composition process described above detects the separators, and processes the input accordingly. For example, knowing there are multiple documents in the input collection, the multimedia overview composition algorithm discussed above may include the first pages of each document, regardless of the information or content of the document.

Copying

Using multimedia overviews of documents, composed according to the discussion above, it is further possible to "copy" a multimedia overview to a cell phone (e.g., an output medium) at either an MFP device, or through the "print" process. In one embodiment, upon a receiving a user's scan of a document, a multimedia overview of the document is generated and transmitted to a target storage medium. In one embodiment, the target storage medium is a medium on the MFP device (e.g., CD, SDcard, flash drive, etc.), storage medium on a networked device, paper (multimedia overviews can be printed with our without the scanned document), VideoPaper (U.S. patent application Ser. No. 10/001,895, entitled "Paper-based Interface for Multimedia Information," Jonathan J. Hull Jamey Graham, filed Nov. 19, 2001) format, or storage on a mobile device upon being transmitted via Bluetooth, WiFi, etc. In another embodiment, a multimedia overview of a document is copied to a target storage medium or target device by printing to the target.

Multimedia Representation Output with Multiple Channels

When documents are scanned, printed, or copied, according the discussion above, multiple visual and audible channels are created. As such, a multimedia overview communicates different types of information, which can be composed to be either generic or specific to a task being performed.

In one embodiment, multiple output channels result when multiple visual and audio channels are overlayed in the same spatial, and/or time space of a multimedia overview of a document. Visual presentations can be tiled in MMNail space, or have overlapping space while being displayed with differing transparency levels. Text can be overlaid or shown in a tiled representation. Audio clips can also overlap in several audio channels, for example background music and speech. Moreover, if one visual channel is more dominant than another, the less dominant channel can be supported by the audio channel. Additional channels such as device vibration, lights, etc. (based on the target storage medium for an output multimedia overview), are utilized as channels to communicate information. Multiple windows can also show different parts of a document. For example, when a multimedia overview is created for a patent, one window/channel could show drawings while the other window/channel navigates through the patent's claims.

Additionally, relevant or non-relevant advertisements can be displayed or played along with a multimedia overview utilizing available audio or visual channels, occupying portions of used channels, overlaying existing channels, etc. In one embodiment, relevant advertisement content is identified via a user identification, document content analysis, etc.

Transmission and Storage of a Multimedia Representation

Multimedia thumbnails can be stored in various ways. Because a composed multimedia overview is a multimedia "clip", any media file format that supports audiovisual presentation, such as MPEG-4, Windows media, Synchronized Media Integration Language (SMIL), Audio Video Interleave (AVI), Power Point Slideshow (PPS), Flash, etc. can be used to present multimedia overviews of documents in the form of multimedia thumbnails and navigation paths. Because most document and image formats enable insertion of user data to a file stream, multimedia overviews can be inserted into a document or image file in, for example, an Extensible Markup Language (XML) format, or any of the above mentioned compressed binary formats.

In one embodiment, a multimedia overview may be embedded in a document and encoded to contain instructions on how to render document content. The multimedia overview can contain references to file(s) for content to be rendered, such as is illustrated in FIG. 4.

Figure 4:
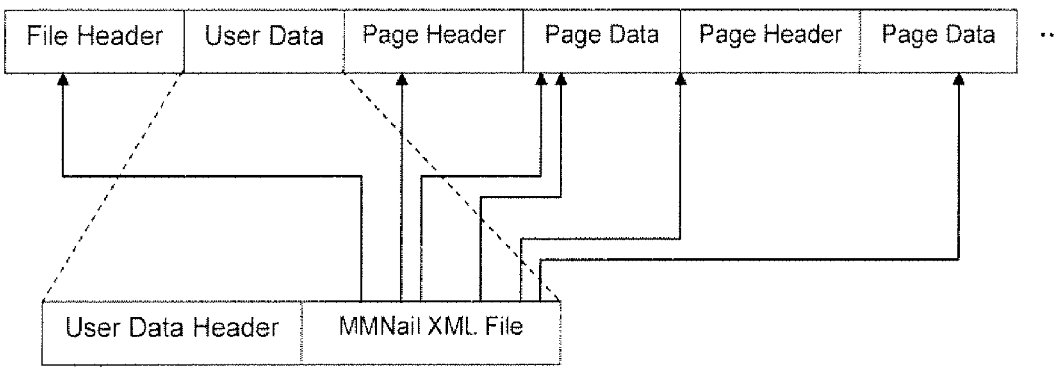
FIG. 4 is an exemplary encoding structure of one embodiment of a multimedia overview of a document.

For example, and as illustrated in FIG. 4, if a document file is PostScript Document Format (PDF) file composed of bitmap images of document pages, a corresponding multimedia overview format includes links to the start of individual pages in the bit stream, as well as instructions on how to animate these images. The exemplary file format further has references to the text in the PDF file, and instructions on how to synthesize this text. This information may be stored in the user data section of a codestream. For example, as shown in FIG. 4, the user data section includes a user data header and an XML file that sets forth location in the codestream of portions of content used to create the multimedia representation of a document.

Additional multimedia data, such as audio clips, video clips, text, images, and/or any other data that is not part of the document can be included as user data in one of American Standard Code for Information Interchange (ASCII) text, Bitmaps, Windows Media Video, Motion Pictures Experts Group Layer 3 Audio compression, etc. However, other file formats may be used to include user data.

An object-based document image format can also be used to store the different image elements and metadata for various "presentation views." In one embodiment, a JPEG2000 JPM file format is utilized. In such an embodiment, an entire document's content is stored in one file and separated into various page and layout objects. The multimedia overview analyzer, as discussed above, would run before creating the file to ensure that all the elements determined by the analyzer are accessible as layout objects in the JPM file.

When the visual content of audiovisual elements are represented as in "Compressed Data Image Object Feature Extraction, Ordering, and Delivery" filed on Dec. 28, 2006, U.S. patent application Ser. No. TBD, then audio content of an audiovisual element can be added as metadata to the corresponding layout objects. This can be done in the form of an audio file, or as ASCII text, that will be synthesized into speech in the synthesis step of MMnail generation.

Audible elements are represented in metadata boxes at file or page level. Audible elements that have visual content associated with it, e.g. the text in a title, but the title image itself is not included in the element list of the MMnail, can be added as metadata to the corresponding visual content.

In one embodiment, various page collections are added to the core code-stream collection of a multimedia overview file to enable access into various presentation views (or profiles). These page collections contain pointers to layout objects that contain the MMNail-element information in a base collection. Furthermore page collections may contain metadata describing zoom/pan factors for a specific display. Specific page collections may be created for particular target devices, such as a PDA display, one for an MFP panel display, etc. Furthermore, page collections may also be created for various user profiles, device profiles, use profile (i.e. car scenario), etc.

In one embodiment, instead of having a full-resolution document content in a base collection, a reduced resolution version is used that contains all the material necessary for the additional page collections, e.g. lower resolution of a selected number of document image objects.

Scalable Multimedia Representations

In one embodiment, multimedia overviews of documents are encoded in a scalable file format. The storage of multimedia overviews, as described herein, in a scalable file format results in many benefits. For example, once a multimedia overview is generated, the multimedia overview may be viewed for a few seconds, or several minutes, without having to regenerate the multimedia overview. Furthermore, scalable file formats support multiple playbacks of a multimedia overview without the need to store separate representations. Varying the playback length of a multimedia overview, without the need to create or store multiple fries, is an example of time scalability. The multimedia overview files, as discussed herein, support the following scalabilities: time scalability; spatial scalability; computation scalability (e.g., when computation resources are sparse, do not animate pages); and content scalability (e.g., show ocr results or not, play little audio or no audio, etc).

Different scalability levels can be combined as Profiles, based on target application, platform, location, etc. For example, when a person is driving, a profile for driving can be selected, where document information is communicated mostly through audio (content scalability); when they are not driving, a profile that gives more information through visual channel can be selected.

Scalability by Time

Time Scalability

Below the MMNail optimization discussed above is further expanded upon, such that it allows time scalability, i.e. creation of MMNail representations for a set of N time constraints $T_1, T_2, \ldots, T_N$. In one embodiment, a goal for scalability is to ensure that elements included in a shorter MMNail with duration $T_1$ are included in any longer MMNail with duration $T_n > T_1$. This time scalability is achieved by iteratively solving equations (4) and (5) for decreasing time constraints as follows:

Given $T_N > \ldots > T_2 > T_1$, for steps n=N, . . . , 1, iteratively solve

For the first stage, $$\text{maximize} \sum_{e\in E_v^{(n)}\cup E_{av}^{(n)}} x_n(e)I(e) \tag{6}$$

$$\text{subject to} \sum_{e\in E_v^{(n)}\cup E_{av}^{(n)}} x_n(e)t(e) \le T_n$$

$$x(e)\in\{0,1\},\ e\in E_v^{(n)}\cup E_{av}^{(n)},$$

where $$E_q^{(n)} = \begin{cases} \{e\in E_q^{(n+1)}\mid x_{n+1}^*(e)=1\}, & n=1,\ldots,N-1 \\ E_q, & n=N \end{cases},\ x_{n+1}^*$$

is a solution of (6) in iteration n+1, and $q\in\{v, av\}$.

For the second stage, $$\text{maximize} \sum_{e\in \hat{E}_a^{(n)}} x_n(e)I(e) \tag{7}$$

$$\text{subject to} \sum_{e\in \hat{E}_a^{(n)}} x_n(e)t(e) \le \beta_n \hat{T}_n$$

$$x_n(e)\in\{0,1\},\ e\in \hat{E}_a^{(n)},$$

where $\beta_n\in[0,1]$ in iteration n, $\hat{T}_n$ is the total time duration to be filled in the audio channel in iteration n, $$\hat{E}_a^{(n)} = \begin{cases} \{e\in \hat{E}_a^{(n+1)}\mid x_{n+1}^{}(e)=1\}, & n=1,\ldots,N-1 \\ \hat{E}_a, & n=N \end{cases},\ x_{n+1}^{}$$

is a solution of (7) in iteration n+1, and $\hat{E}_a=\{e\in E_a \mid t(e)\le\gamma_n\hat{T}/R\}$, where $\gamma_n\in[0,R_n]$ and $R_n$ is the number of separated empty audio intervals in iteration n. In one embodiment β_n=1/2 for n=1, . . . N. A solution $\{x_n^*, x_n^{**}\}$ to this iterative problem describes a set of time-scalable MMNail representations for time constraints $T_1, T_2, \ldots, T_N$, where if document element e is included in MMNail with duration constraint $T_t$, it is included in the MMNail with duration constraint $T_n > T_t$.

If, however, the monotonicity condition is not fulfilled for an element inclusion at a given time, then for each time interval $T_1$, a page collection is stored. In this configuration, a set of time intervals $T_1, \ldots T_n$ is also given.

Scalability by Computation

In one embodiment, a multimedia overview file format, for a hierarchical structure, is defined by describing the appropriate scaling factors and then an animation type (e.g., zoom, page, page flipping, etc.). The hierarchical/structural definition is done, in one embodiment, using XML to define different levels of the hierarchy. Based on computation constraints, only certain hierarchy levels are executed.

One exemplary computational constraint is network bandwidth, where the constraint controls the progression, by quality, of image content when stored as JPEG2000 images. Because a multimedia overview is played within a given time limit (i.e., a default duration or user-defined duration), restricted bandwidth results in a slower speed for the display, animation, pan, zoom, etc. actions than at a "standard" bandwidth/speed. Given a bandwidth constraint, or any other computational constraint imposed on a multimedia overview, fewer bits of a JPEG2000 file are sent to display the multimedia over, in order to compensate for the slow-down effect.

Spatial Scalability

In one embodiment, multimedia overviews of a document are created and stored in file formats with spatial scalability. The multimedia overview, created and stored with Spatial Scalability, supports a range of target spatial resolutions and aspect ratios of a target display device. If an original document and rendered pages are to be included with a multimedia overview, the inclusion is achieved by specifying a downsample ratio for high quality rendered images. If this is not the case, i.e., high quality images are not available, then multiple resolutions of images can be stored in a progressive format without storing images at each resolution. This is a commonly used technique for image/video representation and details on how such representations work can be found in the MPEG-4 ISO/IEC 14496-2 Standard.

Scalability by Content

Certain audio content, animations, and textual content displayed in a multimedia overview may be more useful than the other content given a certain applications. For example, while driving, audio content is more important than textual or animation content. However, when previewing a scanned document, the OCR'ed text content is more important than associated audio content. The file format discussed above supports the inclusion/omission of different audio/visual/text content in a multimedia overview presentation.

Applications

The techniques described herein may be potentially useful for a number of applications. For example, the techniques may be used for document browsing for devices, such as mobile devices and multi-function peripherals (MFPs).

For example, when performing interactive document browsing on a mobile device, the document browsing can be re-defined, for example, instead of zoom and scroll, operations may include, play, pause, fast forward, speedup, and slowdown.

In another mobile device application when performing document viewing and reviewing on mobile devices, the techniques set forth herein may be used to allow a longer version of the MMNail (e.g., 15 minutes long) to be used to provide not only an overview but also understand the content of a document. This application seems to be suitable for devices with limited imaging capabilities, but preferred audio capability, such as cell phones. After browsing and viewing a document with a mobile device, in one embodiment, the mobile device sends it to a device (e.g., an MFP) at another location to have the device perform other functions on the document (e.g., print the document).

In one MFP application, the techniques described herein may be used for document overview. For example, when a user is copying some documents at the MFP, as the pages are scanned, an automatically computed document overview may be displayed to the user, giving a person a head start in understanding the content of the document.

An image processing algorithm performing enhancement of the document image inside an MFP may detect regions of problematic quality, such as low contrast, small font, halftone screen with characteristics interfering with the scan resolution, etc. An MMNail may be displayed on the copier display (possibly without audio) in order to have the user evaluating the quality of the scanned document (i.e., the scan quality) and suggest different settings, e.g., higher contrast, higher resolution.

In a Translation Application, the language for the audio channel can be selected by the user and audible information may be presented in language of choice. In this case, the optimizer functions differently for different languages since the length of the audio would be different. That is, the optimizer results depend on the language. In one embodiment, visual document text is altered. The visual document portion can be re-rendered in a different language.

In one embodiment, the MMNail optimizations are computed on the fly, based on interactions provided by user. For example, if the user closes the audio channel, then other visual information may lead to different visual representation to accommodate this loss of information channel. In another example, if the user slows downs the visual channel (e.g., while driving a car), information delivered through the audio channel may be altered (e.g., an increased amount of content being played in the audio channel). Also, animation effects such as, for example, zoom and pan, may be available based on the computational constraints of the viewing device.

In one embodiment, the MMnails are used to assist disabled people in perceiving document information. For example, visual impaired people may want to have small text in the form of audible information. In another example, color blind people may want some information on colors in a document be available as audible information in the audio channel, e.g. words or phrased that are highlighted with color in the original document.

An Example of a Computer System

Figure 5:
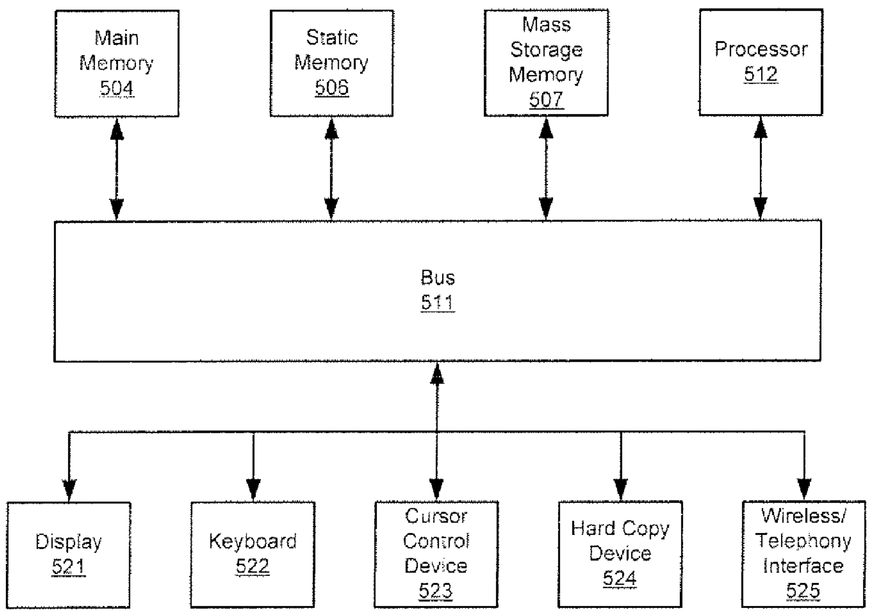
FIG. 5 is a block diagram of one embodiment of a computer system.

FIG. 5 is a block diagram of an exemplary computer system that may perform one or more of the operations described herein. Referring to FIG. 5, computer system 500 may comprise an exemplary client or server computer system. Computer system 500 comprises a communication mechanism or bus 511 for communicating information, and a processor 512 coupled with bus 511 for processing information. Processor 512 includes a microprocessor, but is not limited to a microprocessor, such as, for example, Pentium Processor, etc.

System 500 further comprises a random access memory (RAM), or other dynamic storage device 504 (referred to as main memory) coupled to bus 511 for storing information and instructions to be executed by processor 512. Main memory 504 also may be used for storing temporary variables or other intermediate information during execution of instructions by processor 512.

Computer system 500 also comprises a read only memory (ROM) and/or other static storage device 506 coupled to bus 511 for storing static information and instructions for processor 512, and a data storage device 507, such as a magnetic disk or optical disk and its corresponding disk drive. Data storage device 507 is coupled to bus 511 for storing information and instructions.

Computer system 500 may further be coupled to a display device 521, such as a cathode ray tube (CRT) or liquid crystal display (LCD), coupled to bus 511 for displaying information to a computer user. An alphanumeric input device 522, including alphanumeric and other keys, may also be coupled to bus 511 for communicating information and command selections to processor 512. An additional user input device is cursor control 523, such as a mouse, trackball, trackpad, stylus, or cursor direction keys, coupled to bus 511 for communicating direction information and command selections to processor 512, and for controlling cursor movement on display 521.

Another device that may be coupled to bus 511 is hard copy device 524, which may be used for printing instructions, data, or other information on a medium such as paper, film, or similar types of media. Furthermore, a sound recording and playback device, such as a speaker and/or microphone may optionally be coupled to bus 511 for audio interfacing with computer system 500. Another device that may be coupled to bus 511 is a wired/wireless communication capability 525 to communication to a phone or handheld palm device. Note that any or all of the components of system 500 and associated hardware may be used in the present invention. However, it can be appreciated that other configurations of the computer system may include some or all of the devices.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. A method comprising:

receiving a static document with electronic content from a scanning operation performed on content in a tangible document;

detecting one or more mobile devices within range of a wireless network;

generating a printer dialog box display with a printer driver for user authoring of a multimedia thumbnail representation of the static document, wherein the printer dialog box display is automatically populated with the one or more detected mobile devices as potential targets;

receiving user specification of a target from the potential targets, a duration, a resolution from one or more potential resolutions, and user input, if any, for creation of a multimedia thumbnail representation from the received static document through the generated display, wherein the one or more potential resolutions for the multimedia thumbnail representation are automatically populated in the printer dialog box display based on user specification of the selected target;

identifying advertising content for inclusion into the multimedia thumbnail representation based on document content analysis of the static document; and generating the multimedia thumbnail representation of the static document, with the identified advertising content, for storage in a file with a scalable storage format for the target utilizing received target, duration, resolution, and user input, wherein the scalable storage format of the file stores two or more scalability levels of the generated multimedia thumbnail representation that can be saved at the target location, wherein generating the printer dialog box further comprises:

populating the printer dialog box display with audible, visual and audiovisual electronic composition elements from the received electronic content, automatically selecting a set of one or more of the audible, visual and audiovisual electronic composition elements for inclusion into one or more presentation channels of the multimedia thumbnail representation based on the time and information content attributes, highlighting each thumbnail representation from the set of one or more audible, visual and audiovisual electronic composition elements automatically selected for inclusion into the multimedia thumbnail representation of the static document with a different type of border than electronic composition elements not automatically selected for inclusion, and receiving user selection within the printer dialog box display of at least one additional audible, visual or audiovisual electronic audiovisual composition element to be included in the multimedia thumbnail representation.

2. The method defined in claim 1 further comprising:

transferring the generated multimedia thumbnail representation of the received electronic visual content to the target for storage at a target device or a target storage medium.

3. The method defined in claim 1, wherein the scalable storage format includes one or more of time scalability, content scalability, spatial scalability, or computational scalability.

4. The method of claim 2, wherein the generated multimedia thumbnail representation is transferred with the received electronic content.

5. The method defined in claim 2, wherein the target storage medium is one or more of a memory card, a compact disc, or paper.

6. The method defined in claim 5 wherein the paper is a video paper file.

7. The method defined in claim 1 where the selection is based on the time and information content attributes.

8. The method defined in claim 1 wherein the time and information content attributes are based on display constraints.

9. The method defined in claim 1, wherein the generating a multimedia thumbnail representation of the received electronic visual content, further comprises:

selecting the advertising content for inclusion into the one or more presentation channels of the multimedia thumbnail representation based the one or more of the computed information content attributes and a target device of the multimedia thumbnail representation.

10. A non-transitory computer readable storage medium with instructions thereon which, when executed by a system, cause the system to perform a method comprising:

receiving a static document with electronic content from a scanning operation performed on content in a tangible document;

detecting one or more mobile devices within range of a wireless network;

generating a printer dialog box display with a printer driver for user authoring of a multimedia thumbnail representation of the received static document, wherein the printer dialog box display is automatically populated with the one or more detected mobile devices as potential targets;

receiving user specification of a target from the potential targets, a duration, a resolution from one or more potential resolutions, and user input, if any, for creation of a multimedia thumbnail representation from the received static document through the generated display, wherein the one or more potential resolutions for the multimedia thumbnail representation are automatically populated in the printer dialog box display based on user specification of the selected target;

identifying advertising content for inclusion into the multimedia thumbnail representation based on document content analysis of the static document; and generating the multimedia thumbnail representation of the static document, with the identified advertising content, for storage in a file with a scalable storage format for the target utilizing received target, duration, resolution, and user input, wherein the scalable storage format of the file stores two or more scalability levels of the generated multimedia thumbnail representation that can be saved at the target location, wherein generating the printer dialog box further comprises:

populating the printer dialog box display with audible, visual and audiovisual electronic composition elements from the received electronic content, automatically selecting a set of one or more of the audible, visual and audiovisual electronic composition elements for inclusion into one or more presentation channels of the multimedia thumbnail representation based on the time and information content attributes, highlighting each thumbnail representation from the set of one or more audible, visual and audiovisual electronic composition elements automatically selected for inclusion into the multimedia thumbnail representation of the static document with a different type of border than electronic composition elements not automatically selected for inclusion, and receiving user selection within the printer dialog box display of at least one additional audible, visual or audiovisual electronic audiovisual composition element to be included in the multimedia thumbnail representation.

11. The non-transitory computer readable storage medium defined in claim 10 wherein the method further comprises:

transferring the generated multimedia thumbnail representation of the received electronic visual content to the target for storage at a target device or a target storage medium.

12. The non-transitory computer readable storage medium defined in claim 10, wherein the scalable storage format includes one or more of time scalability, content scalability, spatial scalability, or computational scalability.

13. The non-transitory computer readable storage medium defined in claim 10 where the selection is based on the time and information content attributes.

14. The non-transitory computer readable storage medium defined in claim 10 wherein the time and information content attributes are based on display constraints.

15. The method defined in claim 1 further comprising: receiving user specification of a timeline when each of the set of audible, visual and audiovisual electronic audiovisual composition elements are to be presented within the multimedia thumbnail representation of the static document.

16. The method defined in claim 15 further comprising: receiving a request to display a preview of the multimedia thumbnail representation within the printer dialog box display; and generating a real-time preview of the multimedia thumbnail representation within the printer dialog box display as user modifications to the multimedia thumbnail representation are received.

17. The non-transitory computer readable storage medium defined in claim 10, further comprises: selecting the advertising content for inclusion into the one or more presentation channels of the multimedia thumbnail representation based the one or more of the computed information content attributes and a target device of the multimedia thumbnail representation.

* * * * *